(12) United States Patent
Harik et al.

(10) Patent No.: US 8,688,720 B1
(45) Date of Patent: Apr. 1, 2014

(54) METHOD AND APPARATUS FOR CHARACTERIZING DOCUMENTS BASED ON CLUSTERS OF RELATED WORDS

(75) Inventors: Georges Harik, Mountain View, CA (US); Noam M. Shazeer, Mountain View, CA (US)

(73) Assignee: Google Inc., Mountain View, CA (US)

( * ) Notice: Subject to any disclaimer, the term of this patent is extended or adjusted under 35 U.S.C. 154(b) by 830 days.

(21) Appl. No.: 12/131,637

(22) Filed: Jun. 2, 2008

Related U.S. Application Data

(63) Continuation of application No. 10/676,571, filed on Sep. 30, 2003, now Pat. No. 7,383,258.

(60) Provisional application No. 60/416,144, filed on Oct. 3, 2002.

(51) Int. Cl.
*G06F 7/00* (2006.01)
(52) U.S. Cl.
USPC .......................................................... 707/755
(58) Field of Classification Search
USPC ......... 707/736, 737, 738, 739, 748, 752, 754, 707/755, 756, 758, 769, 771
See application file for complete search history.

(56) References Cited

U.S. PATENT DOCUMENTS

| | | | |
|---|---|---|---|
| 5,675,819 A * | 10/1997 | Schuetze | 704/10 |
| 5,794,050 A | 8/1998 | Dahlgren et al. | |
| 5,815,830 A | 9/1998 | Anthony | |
| 6,078,914 A | 6/2000 | Redfern | |
| 6,108,662 A | 8/2000 | Hoskins et al. | |
| 6,137,911 A * | 10/2000 | Zhilyaev | 382/225 |
| 6,161,130 A * | 12/2000 | Horvitz et al. | 709/206 |
| 6,651,054 B1 | 11/2003 | de Judicibus | |
| 6,684,205 B1 | 1/2004 | Modha et al. | |
| 6,751,611 B2 | 6/2004 | Krupin et al. | |
| 6,820,093 B2 | 11/2004 | de la Huerga | |
| 6,868,525 B1 | 3/2005 | Szabo | |
| 7,013,298 B1 | 3/2006 | de la Huerga | |
| 7,363,308 B2 | 4/2008 | Dillon et al. | |
| 8,024,372 B2 | 9/2011 | Harik et al. | |
| 8,145,712 B2 | 3/2012 | Harik et al. | |
| 8,156,100 B2 | 4/2012 | Dean et al. | |
| 8,224,964 B2 | 7/2012 | Fredrickson et al. | |
| 8,275,790 B2 | 9/2012 | Fredricksen et al. | |
| 8,285,793 B1 | 10/2012 | Harik et al. | |

(Continued)

OTHER PUBLICATIONS

Graham, Ian S., "The HTML Sourcebook", John Wiley & Sons, 1995 (ISBN 0471118494) (pgs. on "partial URLs" and "BASE element", e.g. pp. 22-27; 87-88; 167-168).

(Continued)

*Primary Examiner* — Robert Beausoliel, Jr.
*Assistant Examiner* — Nirav K Khakhar
(74) *Attorney, Agent, or Firm* — Fish & Richardson P.C.

(57) ABSTRACT

One embodiment of the present invention provides a system characterizes a document with respect to clusters of conceptually related words. Upon receiving a document containing a set of words, the system selects "candidate clusters" of conceptually related words that are related to the set of words. These candidate clusters are selected using a model that explains how sets of words are generated from clusters of conceptually related words. Next, the system constructs a set of components to characterize the document, wherein the set of components includes components for candidate clusters. Each component in the set of components indicates a degree to which a corresponding candidate cluster is related to the set of words.

21 Claims, 16 Drawing Sheets

(56) References Cited

U.S. PATENT DOCUMENTS

| | | |
|---|---|---|
| 8,352,452 B2 | 1/2013 | Dean et al. |
| 8,412,747 B1 | 4/2013 | Harik et al. |
| 2002/0087310 A1 | 7/2002 | Lee et al. |
| 2002/0120619 A1 | 8/2002 | Marso et al. |
| 2003/0037041 A1* | 2/2003 | Hertz .................................. 707/1 |
| 2003/0088562 A1* | 5/2003 | Dillon et al. ....................... 707/5 |
| 2004/0008308 A1 | 1/2004 | Yamahara |
| 2004/0008308 A1 | 5/2004 | Bailey et al. |
| 2007/0156677 A1 | 7/2007 | Szabo |
| 2008/0004904 A1 | 1/2008 | Tran |
| 2009/0318779 A1 | 12/2009 | Tran |

OTHER PUBLICATIONS

Thistlewaite, Paul, "Automatic Construction and Management of Large Open Webs", Information Processing and Management: an International Journal, vol. 33, Issue 2, Mar. 1997, pp. 161-173 (ISSN 0306-4573).

Myka, Andreas, et al., "Automatic Hypertext Conversion of Paper Document Collections" (ch.6), Digital Libraries Workshop DL '94, Newark NJ, May 1994 (selected papers), pp. 65-90.

Mills, Tim et al., "Providing World Wide Access to Historical Sources", Computer Networks and ISDN Systems, vol. 29, Nos. 8-13, Sep. 1997, pp. 1317-1325.

Jordan, Michael I. et al., "Hidden Markov Decision Trees", 1997, Center for Biological and Computational Learning Massachusetts Institute of Technology and Department of Computer Science, University of Toronto Canada.

Geiger, Dan et al., "Asymptotic Model Selection for Directed Networks with Hidden Variables", May 1996, Technical Report MSR-TR-96-07, Microsoft Research, Advanced Technology Division.

Heckerman, David et al., "Learning Bayesian Networks: The Combination of Knowledge and Statistical Data", Microsoft Research, Advanced Technology Division.

Meila, Marina et al., "Estimating Dependency Structure as a Hidden Variable", Massachusetts Institute of Technology, A.I. Memo No. 1648, C.B.C.L. Memo No. 165, Sep. 1998.

Notice of Allowance for related case (U.S. Appl. No. 10/676,571), mailed from USPTO on Sep. 30, 2003.

Notice of Allowance for related case (U.S. Appl. No. 10/788,837), mailed from USPTO on Feb. 26, 2004.

Office Action for related case (U.S. Appl. No. 10/788,837), mailed from USPTO on Feb. 26, 2004.

Office Action for related case (U.S. Appl. No. 10/676,571), mailed from USPTO on Sep. 30, 2003.

Office Action for related U.S. Appl. No. 10/676,571, mailed from USPTO on Jun. 6, 2006, 12 pages.

Office Action for related U.S. Appl. No. 10/676,571, mailed from USPTO on Aug. 23, 2006, 12 pages.

Notice of Allowance for related U.S. Appl. No. 10/676,571, mailed from USPTO on Dec. 18, 2006, 4 pages.

Notice of Allowance for related U.S. Appl. No. 10/676,571, mailed from USPTO on Sep. 6, 2007, 5 pages.

Notice of Allowance for related U.S. Appl. No. 10/788,837, mailed from USPTO on Oct. 23, 2006, 8 pages.

Notice of Allowance for related U.S. Appl. No. 10/788,837, mailed from USPTO on Jan. 16, 2007, 7 pages.

Office Action for related U.S. Appl. No. 10/788,837, mailed from USPTO on Aug. 4, 2004, 10 pages.

Office Action for related U.S. Appl. No. 11/796,383, mailed from USPTO on Sep. 20, 2010, 17 pages.

Notice of Allowance for related U.S. Appl. No. 11/796,383, mailed from USPTO on Feb. 4, 2011, 4 pages.

Notice of Allowance for related U.S. Appl. No. 11/796,383, mailed from USPTO on May 16, 2011, 5 pages.

Office Action for related U.S. App. No. 13/237,861, mailed from USPTO on Jan. 19, 2012, 9 pages.

Notice of Allowance for related U.S. Appl. No. 13/237,861, mailed from USPTO on Aug. 28, 2012, 9 pages.

Notice of Allowance for related U.S. Appl. No. 13/237,861, mailed from USPTO on Dec. 7, 2012, 7 pages.

Notice of Allowance for related U.S. Appl. No. 13/733,087, mailed from USPTO on Sep. 11, 2013, 22 pages.

\* cited by examiner

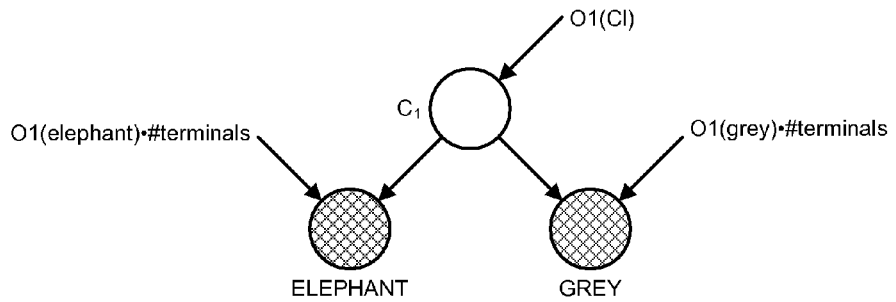
FIG. 15.1
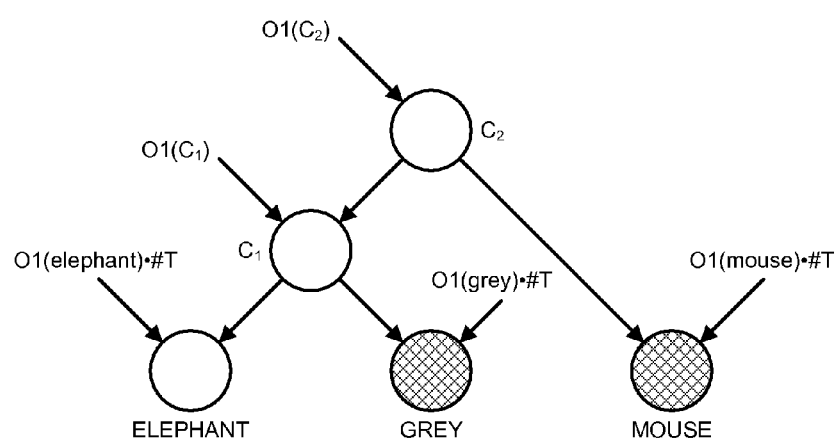
FIG. 15.2A
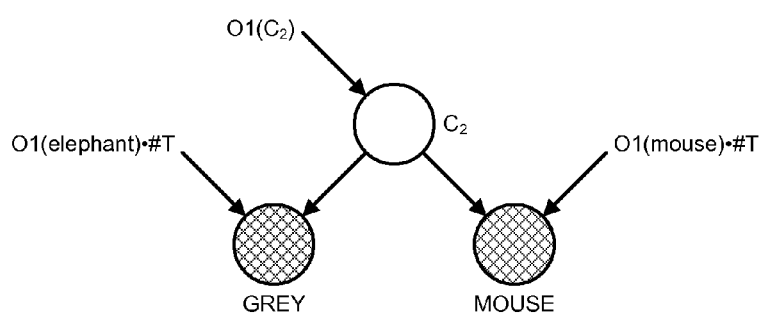
FIG. 15.2B

Current (60)   Last 0 1 2 3 4 5 6 7 8 9 10 11 12 13 14 15 16 17 18 19 20 21 22 23 24 25 26 27 28 29 30 31 32 33 34 35 36 37 38 39 40 41 42 43 44 45 46 47 48 49 50 51 52 53 54 55 56 57 58 59   random

[ Phil Search ]

Model of 1378939 clusters

```
595417600  CANADA
 36464964  [ john david mark paul michael scott ]
 29024010  [ free sex porn pics movies xxx ]
 21810398  [ uk england london in-the-uk ltd friends-reunited ]
 17580210  [ pictures of picture photos pics images ]
 15994938  [ lyrics song lyric songs by midi ]
 13239308  [ download exe windows-media-player microsoft winzip zip ]
 10754172  [ and education social research studies theory ]
 10019350  [ a the is to that you ]
  9922017  [ nude naked pics pictures photos pamela-anderson ]
  9749012  [ parts car cars auto performance automobile ]
  7980547  [ jennifer lisa amy michelle sarah jessica ]
  7880218  [ linux howto rpm mandrake freebsd redhat ]
  7734638  [ john william james thomas george charles ]
  7286616  [ windows-2000 server setup win2k network problem ]
  6892531  [ the in of from history life ]
  6588060  [ treatments side-effects medicine mayo-clinic medication hypertension ]
  6408187  [ jobs job employment in job-search careers ]
  5935054  [ business management marketing strategy services technology ]
  5827852  [ university college harvard cornell stanford at ]
  5250601  [ state california texas government florida new-york ]
  4999860  [ crack serial warez download cracks keygen ]
  4788106  [ history of the origin origins timeline ]
  4768048  [ map of maps world road usa ]
  4738298  [ lyrics discography band music official tour ]
  4479820  [ australia sydney australian melbourne brisbane nsw ]
  4475140  [ software free download freeware program shareware ]
  4377300  [ real-estate realestate homes realty realtor home ]
  4240840  [ university of michigan minnesota arizona chicago ]
  4224342  [ javascript asp vbscript function example php ]
  3908765  [ of in for the a what-is ]
  3890368  [ de la en el y del ]
```

Phil: /cl?CID=4737501&iteration=60
Current (60)   Last 0 1 2 3 4 5 6 7 8 9 10 11 12 13 14 15 16 17 18 19 20 21 22 23 24 25 26 27 28 29 30 31 32 33 34 35 36 37 38 39 40 41 42 43 44 45 46 47 48 49 50 51 52 53 54 55 56 57 58 59   random

[                              ]   [ Phil Search ]

```
PARENTS
6577887     CANADA (0.011109, inf)
CHILDREN
... 8020 children omitted ...
31907   [ internships internship summer interns paid intern ] (0.00499159, inf)
31907   [ layoffs layoff 2001 lay-off job-cuts news ] (0.00499159, inf)
31907   [ developer software programmer developers development engineer ] (0.00499159, inf)
31907   [ network administrator engineer it support administration ] (0.00499159, inf)
35253   [ pharmaceutical companies pharmaceuticals pharma sales company ] (0.00551656, inf)
35253   [ orange-county california in southern-california ca irvine ] (0.00551656, inf)
35253   [ writing writers writer fiction writer's freelance ] (0.00551656, inf)
35253   [ volunteer international work abroad overseas volunteering ] (0.00551656, inf)
35253   [ sales rep representative reps representatives pharmaceutical ] (0.00551656, inf)
38950   [ manager director of job-description duties role ] (0.00609675, inf)
38950   [ for students student graduates teachers jobs ] (0.00609675, inf)
38950   [ in working work abroad living jobs ] (0.00609675, inf)
38950   [ jobs germany in it europe companies ] (0.00609675, inf)
38950   [ recruiters headhunters recruiter headhunter executive head-hunters ] (0.00609675, inf)
43032   [ business a starting-a start small-business how-to-start-a ] (0.00673795, inf)
43032   [ advertising agency marketing group communications ad ] (0.00673795, inf)
43032   [ construction building contractors industry company projects ] (0.00673795, inf)
52521   [ association of american associations national society ] (0.00822975, inf)
52521   [ alberta calgary edmonton canada red-deer city-of ] (0.00822975, inf)
52521   [ executive-search executive recruiters recruiting recruiter search ] (0.00822975, inf)
52521   [ agencies employment agency recruitment temporary employment ] (0.00822975, inf)
58019   [ resume resumes sample cover-letter writing samples ] (0.00909528, inf)
58019   [ pilot aviation pilots training flight flying ] (0.00909528, inf)
64091   [ atlanta georgia ga marietta marta alpharetta ] (0.0100518, inf)
64091   [ australia in australian austrailia new-zealand ] (0.0100518, inf)
64091   [ companies top company largest top-10 top-100 ] (0.0100518, inf)
64091   [ temporary temp employment agency staffing services ] (0.0100518, inf)
70794   [ in new-york new-york-city nyc ny new-jersey ] (0.011109, inf)
70794   [ companies in company companys based business ] (0.011109, inf)
78194   [ design graphic web graphics designs studio ] (0.0122773, inf)
95377   [ jobs programmer job programming contract it ] (0.0149956, inf)
105325      [ engineering mechanical engineer engineers aerospace design ] (0.0165727, inf)
105325      [ career careers job carrer information advice ] (0.0165727, inf)
105325      [ jobs government canada federal government canadian ] (0.0165727, inf)
116301      [ how-to-become-a becoming-a for a career to-become-a ] (0.0183156, inf)
128409      [ employment opportunities employement job-opportunities emploment human-resources ] (0.0202419, inf)
172725      [ recruitment uk jobs london agency it ] (0.0273237, inf)
190617      [ salary salaries average salary-survey wages pay ] (0.0301974, inf)
210332      [ programs degree program education online masters ] (0.0333733, inf)
378070      [ in jobs for india it bangalore ] (0.0608101, inf)
ID 4737501
Total Firing: 6408187.000000
Total Activation: 11139140.000000
Outlink Sum: 0.848506
Activated Outlink Sum: 0.521899
 1841287    jobs (0.165299, inf) lm
 410846     job (0.0368832, inf) lm
 275398     employment (0.0247235, inf) lm
 554585     in (0.0497871, inf) lm
 167037     job-search (0.0149956, inf) lm
 123744     careers (0.011109, inf) lm
 75054      it (0.00673795, inf) lm
 55602      career (0.00499159, inf) lm
 33724      job-opportunities (0.00302755, inf) lm
 33724      human-resources (0.00302755, inf) lm
 24983      job-listings (0.00224287, inf) lm
 22606      job-openings (0.00202943, inf) lm
 24983      part-time (0.00224287, inf) lm
```

FIG. 17

Phil: /terminal?TERMINALID=66&iteration=60

Current (60)   Last 0 1 2 3 4 5 6 7 8 9 10 11 12 13 14 15 16 17 18 19 20 21 22 23 24 25 26 27 28 29 30 31 32 33 34 35 36 37 38 39 40 41 42 43 44 45 46 47 48 49 50 51 52 53 54 55 56 57 58 59   random

[                                    ] [ Phil Search ]

TERMINAL: jobs
Firing: 3049398.000000

| | | |
|---|---|---|
| 1841287 | [ jobs job employment in job-search careers ] | (0.165299, inf) |
| 193885 | [ jobs uk in vacancies job in-the-uk ] | (0.165299, inf) |
| 114955 | [ jobs government canada federal government canadian ] | (0.496585, inf) |
| 101975 | CANADA | (3.04325e-05, inf) |
| 71384 | [ in jobs for india it bangalore ] | (0.0608101, inf) |
| 56521 | [ recruitment uk jobs london agency it ] | (0.0301974, inf) |
| 54619 | [ india in indian bangalore mumbai companies ] | (0.0100518, inf) |
| 35967 | [ teaching jobs teacher in education positions ] | (0.165299, inf) |
| 32069 | [ jobs summer cool library alaska fun ] | (0.67032, inf) |
| 29948 | [ jobs employment summer student ontario government ] | (0.182684, inf) |
| 25768 | [ jobs programmer job programming contract it ] | (0.082085, inf) |
| 22452 | [ work-at-home work-from-home at-home home jobs from-home ] | (0.0608101, inf) |
| 19363 | [ jobs germany in it europe companies ] | (0.110803, inf) |
| 18524 | [ international jobs development overseas asia africa ] | (0.40657, inf) |
| 16560 | [ freelance writing jobs writers writer journalism ] | (0.149569, inf) |
| 16080 | [ government federal us jobs goverment opm ] | (0.0368832, inf) |
| 15667 | [ state of jobs dept michigan ohio ] | (0.011109, inf) |
| 15364 | [ english teaching in teach japan jobs ] | (0.0301974, inf) |
| 14444 | [ jobs television media production broadcast broadcasting ] | (0.548812, inf) |
| 14107 | [ jobs colorado new-mexico colorado-springs state mental-health ] | (0.67032, inf) |
| 13111 | [ jobs summer work part-time student temporary ] | (0.201897, inf) |
| 12860 | [ ireland dublin irish in cork galway ] | (0.00609675, inf) |
| 9639 | [ houston jobs employment houston-chronicle epidemiology houstonjobs ] | (0.5, inf) |
| 9177 | [ hawaii jobs hawai tech federal kaiser-permanente ] | (0.67032, inf) |

Phil: /terminal?TERMINALID=3&iteration=60
Current (60)   Last 0 1 2 3 4 5 6 7 8 9 10 11 12 13 14 15 16 17 18 19 20 21 22 23 24 25 26 27 28 29 30 31 32 33 34 35 36 37 38 39 40 41 42 43 44 45 46 47 48 49 50 51 52 53 54 55 56 57 58 59   random

[                                        ]   [ Phil Search ]

TERMINAL: in
Firing: 22880440.000000

```
5567652    CANADA  (0.00166156, inf)
1822563    [ the in of from history life ]  (0.135335, inf)
1191284    [ in a using how-to with to ]  (0.149569, inf)
 838956    [ of in for the a what-is ]  (0.082085, inf)
 712471    [ hotels in cheap near hostels london ]  (0.301194, inf)
 554585    [ jobs job employment in job-search careers ]  (0.0497871, inf)
 550830    [ in universities education colleges courses usa ]  (0.122456, inf)
 446031    [ india in indian bangalore mumbai companies ]  (0.082085, inf)
 438108    [ in girls thongs bikinis women teens ]  (0.332871, inf)
 350253    [ in new-york new-york-city nyc ny new-jersey ]  (0.301194, inf)
 304518    [ stores store in retail shops online ]  (0.100259, inf)
 279085    [ in of companies usa directory list ]  (0.135335, inf)
 264904    [ the of in and role women ]  (0.110803, inf)
 241372    [ in shops uk london shop england ]  (0.165299, inf)
 239862    [ embassy in us american british usa ]  (0.082085, inf)
 210098    [ canada canadian in ontario toronto quebec ]  (0.135335, inf)
 207795    [ for-sale property houses in estate-agents properties ]  (0.100259, inf)
 200767    [ apartments apartment in rentals for-rent rent ]  (0.0672055, inf)
 199096    [ australia in australian sydney austrailia new-zealand ]  (0.182684, inf)
 194042    [ in jobs for india it bangalore ]  (0.165299, inf)
 172192    [ in africa south-africa aids african poverty ]  (0.246597, inf)
 167666    [ in the where-is is what what-is ]  (0.110803, inf)
 166474    [ for-sale homes in houses land condos ]  (0.149569, inf)
 155791    [ education in schools school children elementary ]  (0.135335, inf)
 130449    [ in the shower on a bed ]  (0.201897, inf)
 125241    [ restaurants in resturants restuarants dining best ]  (0.110803, inf)
 124782    [ in c c++ string function strings ]  (0.100259, inf)
 120925    [ food culture in people foods traditional ]  (0.0608101, inf)
 119587    [ india in of indian on india's ]  (0.100259, inf)
 118897    [ code in program for c c++ ]  (0.082085, inf)
 113873    [ in new-england massachusetts new-hampshire connecticut maine ]  (0.165299, inf)
 109394    [ club clubs in bar bars nightclub ]  (0.0497871, inf)
 103115    [ statistics in population united-states us percentage ]  (0.0608101, inf)
  96280   [ jobs uk in vacancies job in-the-uk ]  (0.082085, inf)
  93810   [ accommodation accomodation in bed-and-breakfast b&b accomadation ]  (0.0742736, inf)
  85136   [ laws law in for on legal ]  (0.0742736, inf)
  83956   [ in pain and on back with ]  (0.090718, inf)
  83808   [ in things-to-do-in activities attractions things-to-do fun ]  (0.301194, inf)
  81116   [ in events london 2001 2002 may ]  (0.100259, inf)
  80008   [ in places places-to-visit visit places-to-go sites ]  (0.22313, inf)
  79652   [ underwear men in briefs speedos boys ]  (0.110803, inf)
                              :
                              :
```

FIG. 19

Phil: /search?iteration=60&q=palo+alto+restaurants&btnG=Phil+Search
Current (60)   Last 0 1 2 3 4 5 6 7 8 9 10 11 12 13 14 15 16 17 18 19 20 21 22 23 24 25 26 27 28 29 30 31 32 33 34 35 36 37 38 39 40 41 42 43 44 45 46 47 48 49 50 51 52 53 54 55 56 57 58 59   random palo alto restaurants                                    [ Phil Search ]

QUERY: palo alto restaurants
palo-alto 15.262480/12747397/9.978931 [CANADA]
restaurants 14.108328/3.750645/8.187777 [CANADA]

network description: -19.019948
Session graph:      8 nodes;      16 edges;   4 segment: 0.000080 secs setup: 0.001456 secs
0.746516 0.746516 0.593943 [ restaurants in resturants restaurants dining best ]
0.682912 0.682912 0.390506 [ san-jose ca sunnyvale santa-clara bay-area mountain-view ]
0.374688 0.374688 0.203739 [ palo-alto menlo-park restaurant evvia palo straights-cafe ]
0.253490 0.253490 0.067851 [ restaurant san-francisco restaurants bacar gary-danko boulevard ]
1.000000 2.000000 0.065285 CANADA
0.031717 0.031717 0.001060 [ california ca bay-area san-jose san-francisco oakland ]
Query matched 8 clusters Considered 6 clusters in 0.000313 seconds. Iterations: 9

Detailed Iteration Graphs gif: 0 1 2 3 ALL
ps:  0 1 2 3 ALL

FIG. 20

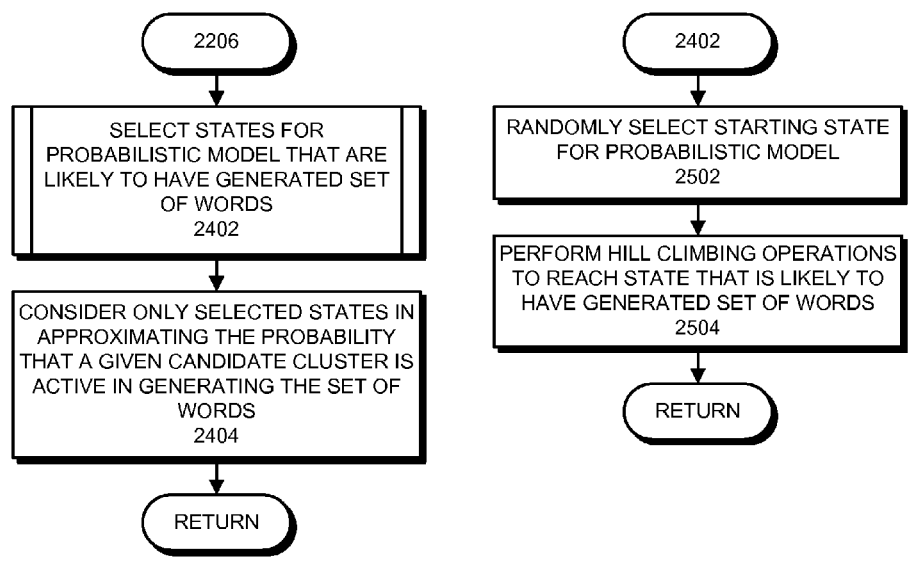

METHOD AND APPARATUS FOR CHARACTERIZING DOCUMENTS BASED ON CLUSTERS OF RELATED WORDS

RELATED APPLICATIONS

This application is a continuation of, and hereby claims priority under 35 U.S.C. section 120 to, pending U.S. patent application Ser. No. 10/676,571, filed 30 Sep. 2003. This parent application is itself is a provisional-conversion of U.S. Provisional Patent Application No. 60/416,144, filed on 3 Oct. 2002, entitled "Methods and Apparatus for Probabilistic Hierarchical Inferential Learner," by inventors Georges Harik and Noam Shazeer.

BACKGROUND

1. Field of the Invention

The present invention relates to techniques for performing queries on textual documents. More specifically, the present invention relates to a method and an apparatus for characterizing a textual document based on clusters of conceptually related words.

2. Related Art

Processing text in a way that captures its underlying meaning—its semantics—is an often performed but poorly understood task. This function is most often performed in the context of search engines, which attempt to match documents in some repository to queries by users. It is sometimes also used by other library-like sources of information, for example to find documents with similar content. In general, understanding the semantics of text is an extremely useful subcomponent of such systems. Unfortunately, most systems written in the past have only a rudimentary understanding, focusing only on the words used in the text, not the meaning behind them.

As an example, let us consider the actions of a user interested in finding a cooking class in palo-alto, california. This user might type into a popular search engine the set of words "cooking classes palo alto". The search engine then typically looks for those words on web pages, and combines that information with other information about such pages to return candidate results to the user. Currently, if the document has the words "cooking class palo alto" several of the leading search engines will not find it, because they do not know that the words "class" and "classes" are related, because one is a subpart—a stem—of the other.

Prototype systems with stemming components have been attempted but without any real success. This is because the problem of determining whether a stem can be used in a particular context is difficult. That might be determined more by other nearby words in the text rather than by the word to be stemmed itself. For example, if one were looking for the James Bond movie, "for your eyes only", a result that returned a page with the words "for your eye only" might not look as good.

In general, existing search systems and other such semantic processing systems have failed to capture much of the meaning behind text.

Hence, what is needed is a method and an apparatus that processes text in a manner that effectively captures the underlying semantic meaning within the text.

SUMMARY

One embodiment of the present invention provides a system characterizes a document with respect to clusters of conceptually related words. Upon receiving a document containing a set of words, the system selects "candidate clusters" of conceptually related words that are related to the set of words. These candidate clusters are selected using a model that explains how sets of words are generated from clusters of conceptually related words. Next, the system constructs a set of components (such as a vector) to characterize the document, wherein the set of components includes components for candidate clusters. Each component in the set of components indicates a degree to which a corresponding candidate cluster is related to the set of words.

In a variation on this embodiment, the model is a probabilistic model, which contains nodes representing random variables for words and for clusters of conceptually related words.

In a further variation, each component in the set of components indicates a degree to which a corresponding candidate cluster is active in generating the set of words.

In a further variation, nodes in the probabilistic model are coupled together by weighted links. If a cluster node in the probabilistic model fires, a weighted link from the cluster node to another node can cause the other node to fire.

In a further variation, if a node has multiple parent nodes that are active, the probability that the node does not fire is the product of the probabilities that links from the active parent nodes do not fire.

In a further variation, the probabilistic model includes a universal node that is always active and that has weighted links to all cluster nodes.

In a variation on this embodiment, the system selects the candidate clusters by constructing an evidence tree. This involves starting with terminal nodes associated with the set of words, and following links in the reverse direction to parent cluster nodes. The system uses this evidence tree to estimate a likelihood that each parent cluster node was active in generating the set of words. The system subsequently selects a parent cluster node to be a candidate cluster node based on its estimated likelihood.

In a variation on this embodiment, estimating the likelihood that a given parent node is active in generating the set of words may involve considering: the unconditional probability that the given parent node is active; conditional probabilities that the given parent node is active assuming parent nodes of the given parent node are active; and conditional probabilities that the given parent node is active assuming child nodes of the given parent node are active.

In a further variation, considering the conditional probabilities involves considering weights on links between nodes.

In a further variation, estimating the likelihood that a given parent node is active in generating the set of words involves marking terminal nodes during the estimation process to ensure that terminal nodes are not factored into the estimation more than once.

In a further variation, constructing the evidence tree involves pruning unlikely nodes from the evidence tree.

In a variation on this embodiment, during construction of the set of components, the degree to which a candidate cluster is active in generating the set of words is determined by calculating a probability that a candidate cluster is active in generating the set of words.

In a variation on this embodiment, during construction of the set of components, the degree to which a candidate cluster is active in generating the set of words is determined by multiplying a probability that a candidate cluster is active in generating the set of words by an activation for the candidate cluster, wherein the activation indicates how many links from the candidate cluster to other nodes are likely to fire.

In a variation on this embodiment, constructing the set of components involves normalizing the set of components.

In a variation on this embodiment, constructing the set of components involves approximating a probability that a given candidate cluster is active over states of the probabilistic model that could have generated the set of words.

In a further variation, approximating the probability involves selecting states for the probabilistic model that are likely to have generated the set of words in the document, and then considering only selected states while calculating the probability that the given candidate cluster is active.

In a further variation, selecting a state that is likely to have generated the set of words involves randomly selecting a starting state for the probabilistic model, and then performing hill-climbing operations beginning at the starting state to reach a state that is likely to have generated the set of words.

In a further variation, performing the hill-climbing operations involves periodically changing states of individual candidate clusters without regards to an objective function for the hill-climbing operations to explore states of the probabilistic model that are otherwise unreachable through hill-climbing operations.

In a variation on this embodiment, the document can include a web page or a set of terms from a query.

BRIEF DESCRIPTION OF THE FIGURES

FIG. 15.1 illustrates a belief network in accordance with an embodiment of the present invention.

FIG. 15.2A illustrates an exemplary network in accordance with an embodiment of the present invention.

FIG. 15.2B illustrates an alternative exemplary network in accordance with an embodiment of the present invention.

FIG. 16 illustrates system output in accordance with an embodiment of the present invention.

FIG. 17 illustrates more system output in accordance with an embodiment of the present invention.

FIG. 18 illustrates even more system output in accordance with an embodiment of the present invention.

FIG. 19 illustrates yet even more system output in accordance with an embodiment of the present invention.

FIG. 20 illustrates results of a search in accordance with an embodiment of the present invention.

FIG. 24 presents a flow chart of the process of approximating probabilities for candidate clusters in accordance with an embodiment of the present invention.

FIG. 25 illustrates how states for the probabilistic model are selected in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

The System

One embodiment of the present invention provides a system that learns concepts by learning an explanatory model of text. In the system's view, small pieces of text are generated in a fairly simple, but incredibly powerful way, through the execution of probabilistic network. The system learns the parameters of this network by examining many examples of small pieces of text.

One embodiment of the system considers the important information in a piece of text to be the words (and compounds) used in the text. For example in the query "cooking classes palo alto" the words are "cooking" and "classes", and the compounds consist of the simple compound "palo alto". Distinguishing compounds from words is done on the basis of compositionality. For example, "cooking classes" is not a compound because it is about both cooking and classes. However "palo alto" is not about "palo" and "alto" separately. This is sometimes a hard distinction to make, but good guesses can make such a system better than no guesses at all.

What this means is that the system simplifies the analysis of text by not considering the order of the words in the text. For example, one embodiment of the present invention does not distinguish the above from "palo-alto classes cooking" (we use dashes in this specification to connect the components of compounds). We will refer to both words and compounds as "terminals". (We will see later this is because in our model of the world, they do not generate words, as opposed to concepts, which do generate words.) This simplification means that the system treats segments of text as a set of terminals.

Probabilistic Model for Text Generation as a Set of Terminals

Figure 1:
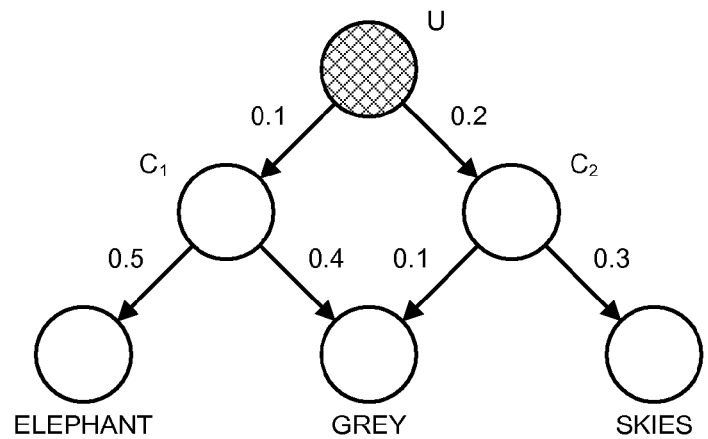
FIG. 1 illustrates a probabilistic model in accordance with an embodiment of the present invention.

Let's look at what a system that generated text as a set of words might look like. FIG. 1 shows one such model. Here, the circles are called model nodes. These nodes represent random variables, each of which models the existence or non-existence of concepts or terminals. The only terminals we are considering in this model are "elephant", "grey" and "skies". There are two concepts, called $C_1$ and $C_2$ (because they are used to generate related words, concepts are sometimes referred to as clusters).

This model might be used for example to explain why the words grey and skies often occur together, why the words grey and elephant often occur together, but yet why the words "elephant" and "skies" rarely occur together. It is because when people are generating text with these words, they have ideas in mind. The system's concepts are supposed to model the ideas in a person's mind before they generate text.

Note that there is a darker node at the top of the figure without a name. This is the universal node, U, which is always active. When modeling text, it is always active, and all concepts come from it. The arrows exiting any concept are called links. These links imply that when a user thinks of one concept, they are likely to think of another concept or write another terminal afterwards. For example, the concept $C_1$ links to the words 'elephant' and 'grey'. That means that after a user thinks of $C_1$, they often write out the words 'elephant' and/or 'grey'. In particular, the numbers on the links are important. They represent the probabilities of certain events. The link between $C_1$ and 'elephant' means that after thinking of $C_1$, a user thinks of the word elephant with probability 0.5. These numbers are often referred to as the 'weights' on the links.

This model can be used or "executed" to generate text. When we are doing this, we begin at the Universal node (often called U), and consider it to exist in the mind of the generator. We will often say that the node is "active" or has "fired" to imply this. For concepts, firing means that the idea of that concept is active, and is able to fire terminals. For terminals, the idea of firing is that the terminals exist in the text to be generated.

Let us run through an example of how one such piece of text could be generated. In the example in FIG. 1, we would start out by assuming that the Universe is active. Then $C_1$ would fire with 0.1 probability. At this point, some random process would decide whether or not $C_1$ would fire or not. For this random process you could throw dice or use any random information. Usually, if this were taking place on a computational machine, a random number generator would be used. Many methods are adequate so long as we have some way of producing a decision, that turns out 9 out of 10 times to be no (0.9) and 1 out of 10 times to be yes (0.1). When it turns out to be yes, the concept $C_1$ is activated. When it turns out no, $C_1$ is not activated. A similar process is applied to $C_2$.

We will assume that for our example now, the random number generator has produced YES for the link Universe→$C_1$ and NO for the link Universe→$C_2$. At this point, $C_1$ is active. When a concept is active, we can then pick random numbers for the other concepts or terminals which have links originating from that active concept. In this example, now the words "elephant" and "grey" have a possibility of becoming active with probabilities of 0.5 and 0.4. Now let us assume that we get more random numbers (to make a simple analogy I will now refer to this as throwing dice) and decide that both elephant and grey are active. This means that we have our piece of text, it is the words "elephant" and "grey". Note that because in one embodiment of the present invention the word order is not modeled, we cannot distinguish "grey elephant" from "elephant grey" (unless they form a compound). In this way, we have generated a small piece of text.

Figure 2:
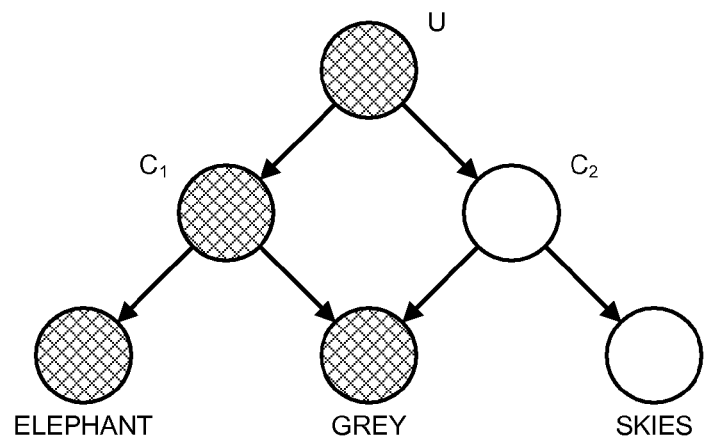
FIG. 2 illustrates a state of the probabilistic model in accordance with an embodiment of the present invention.

FIG. 2 shows this particular execution of the model detailed in FIG. 1. In this figure, we see the concept $C_1$ becoming active, we illustrate this graphically by darkening the node, and the words elephant and grey becoming active. This idea of graphically viewing the execution model of a piece of text is important from the standpoint of examining the whole system to see if it is operating correctly, and we will use it later on.

This seems like a lot of work to generate a grey elephant. Note however that the words we came up with have some meaning to us as people. This is because elephants are grey. In some small way, even this model in FIG. 1 captures a little bit about the state of the world. If only on the surface, this model captures the correlation between the words grey and elephant, grey and skies, but not elephant and skies.

Our system learns the intermediate concepts, the links and the link weights—in order to explain the co-occurrence of words and compounds in small pieces of text. In addition, its generative model is slightly more complicated than that above, in order to better be able to generate and explain text of various sizes (for example, queries are often 2-3 words, while documents are 1000 words or so).

Adjusting for Text of Various Sizes

For various reasons, the type of simple model above is slightly inadequate for dealing with text. A simple explanation for this is that each of the concepts produces a certain number of words, but finds it much more difficult for example to produce many words if the weights on the links are small. It would be desirable for example if a concept could produce either a few or many words from the terminals it points at.

Figure 3:
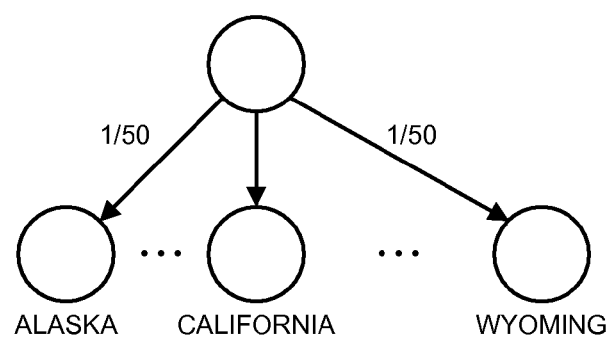
FIG. 3 illustrates a model representing states in the United States in accordance with an embodiment of the present invention.

FIG. 3 shows an example concept representing the states of the United States of America. In following our earlier model, the concept can fire terminals representing each of the 50 states, each with probability 1/50. Now, for this model to generate the word California alone is not that improbable. That probability is roughly $(1/50)*(49/50)^{49}$, which is approximately 0.7%. For this concept to fire all the states would be $(1/50)^{50}$ which is incredibly small. However, should we develop such a concept that covers the idea of the states of the United States, we would want it to explain pieces of text where all the states occur.

In order to address this problem, before it fires other terminals, each concept picks an activation level. Conceptually, this activation level chooses "how many" terminals are to be picked from this concept. Note that this activation level is not a quality of our model. In fact, it is only chosen when the model is being executed. What activation does is it modifies the probability that this concept fires each of its terminals (but not its sub-concepts, i.e. concept to concept linking is unaffected by activation).

The exact numerical adjustment can be as follows. If a link has a weight W and the cluster chooses activation A in its execution, and the link points between a concept and a terminal, then the concept fires the terminal with probability $(1-e^{-AW})$. Here "e" the common mathematical number approximately 2.71. At first glance, this formulation seems odd, but it has the following nice properties: When W is very small (<0.01) and A is a small number (say 2) the probability is approximately equal to AW—so these numbers are easy to approximate in general. The reason they have an odd exponential form, is that probabilities have to have an upper limit of 1. So, having a link weight of 0.02 (1/50) and an activation of 100 should not give you a probability 2.0. The exponential form also has a number of other nice theoretical properties from a mathematical standpoint.

At this point, we have detailed almost all the individual pieces comprising of our model. One detail is the interaction between two or more clusters trying to fire the same terminal or cluster. In this case, each interaction is independent of the other. In particular, the probability that the result does NOT fire is the product of the probability that each cause does NOT fire it. For example, if three clusters $C_1, C_2, C_3$ link to a fourth cluster $C_4$ with weights 0.1, 0.2, 0.3 and $C_1, C_2$ and $C_3$ are active: $C_4$ does not fire with probability (1−0.1)*(1−0.2)*(1−0.3) or (0.9)*(0.8)*(0.7) or 0.504. Therefore, the chance is DOES fire is 1−(1−0.1)*(1−0.2)*(1−0.3) or 1−0.504=0.496.

Another thing we have not mentioned is the prior probability with which activations are picked. The learning of the model turns out not to be too sensitive to this. There, the activation is constrained to be ∃1 and a probability equal to 1/A log*A is the prior on the activation (wherein log*A=A log A log log A log log log A . . . ). This turns out to be important only for the purpose of generating text. For that purpose, any distribution which generates roughly the correct number of words out of a base model should be adequate.

Bayesian Networks

At this point and before we proceed it is worthwhile to talk about a certain duality between the model we have been talking about and a certain class of probabilistic models called Bayesian Networks.

Bayesian networks are well-understood probabilistic modeling techniques in which conditional independences are asserted between various random variables in a joint distribution. As in the model above, Bayesian networks have nodes and directed links. These networks compactly represent a joint distribution over a number of random variables while structurally representing conditional independence assumptions about these variables.

In a Bayesian network, the set of nodes pointing to a node is called its "parents". The set of nodes reachable from a node via following links is called its "descendants" or "children"; and the structure implies that a node is independent of its non-descendants given its parents. The entire distribution is therefore encoded in the conditional probability tables of a child given its parents (nodes with no parents have their own distributions). The probability of a particular instantiation of the entire network is simply then the product of the probabilities of each child given its parents.

Bayesian networks are related to our model in the following way, if each node in the execution of our model is considered to be a random variable then the joint distribution over the set of nodes that are turned on is exactly that which arises from considering our model as a Bayesian network with noisy-or combination functions. Noisy-or conditional probabilities turn a boolean child on independently from each parent. That is, the probability of a child being off is the product of the probability that each parent does not fire it. Note this is exactly the combination function used in our model to decide if multiple active concepts that link to a terminal fire it. Note that Bayesian networks are themselves a subclass of more general probabilistic models.

Learning

At this point, we have gone over how an existing model could be used to generate text. We have not detailed a couple aspects of this work: (1) how our model is learned; (2) how our model is used to estimate the concepts present in text; and (3) how our model is used in practical situations. In this section, we will attempt to detail how our model is learned, and the various techniques that can be used for this purpose.

In learning a generative model of text, in one embodiment of the present invention some source of text must be chosen. Some considerations in such a choice are as follows: (1) it should have related words in close proximity; (2) it should present evidence that is independent, given the model we are trying to learn (more on this later); and (3) it should be relevant to different kinds of text. For this reason, the implementation of the model which follows uses exemplary "query sessions" from a search engine as its small pieces of text. We have also implemented and run our model on web pages and other sources of text, but for the purposes of making this exposition more concrete, we focus on the analysis of query sessions.

To be more precise, we define a query session (also referred to as a user session or a session) as the set of words used by a single user on a search engine for a single day. Often users will search for related material, issuing several queries in a row about a particular topic. Sometimes, these queries are interspersed with random other topics. An example query session (not an actual one) might look as follows:

the graduate
dustin hoffman
rain main
autism
cool junk
fast cars
tom cruise nicole kidman Each query here is on a separate line. Note that most of the words are related in some way. The first is a movie by Dustin Hoffman, as is the third. The second is Dustin Hoffman himself. The fourth deals with an issue brought up in the movie. The fifth query "cool junk" is not related to the main topic of the session, neither is the sixth "fast cars". The last is a little related because Tom Cruise acted in Rain Man with Dustin Hoffman. In general, there is a lot of information in such a small piece of text, using which we can draw conclusions, but there is also a lot of uncorrelated junk. The main task our system has is to cull out the proper correlations from the junk, while looking at a large number (billions) of such pieces of text.

Learning a probabilistic model that can explain all the words that occur together in queries is difficult. Note that in the explanation of the session above, we used information we had about the world in general to explain the query session. This is the nature of the information that our model learns in order to come up with a world model in which a session above is more than infinitesimally likely. The following is such an approach.

Imagine that we don't know what the model is, but we know that a large number of concepts exists. Probabilistic networks can themselves be used to represent this uncertainty. A node can be introduced representing each link between a concept and another concept or a terminal. These kinds of nodes are called global nodes, and they represent our uncertainty about the model itself These global nodes are different than the model nodes above, in fact they represent uncertainty about the model nodes and links. Now, for each piece of text (user session) we replicate the entire model, creating a local network. Each model node replica is called a local node, and these local nodes represent our uncertainty about whether or not a concept exists for a particular execution, the one that lead to this piece of text. In order to learn our model, we have to take into account all of our uncertainty about our model, and do some sort of reasoning to come up with a best model, or a set of models using which we can do further processing.

Figure 4:
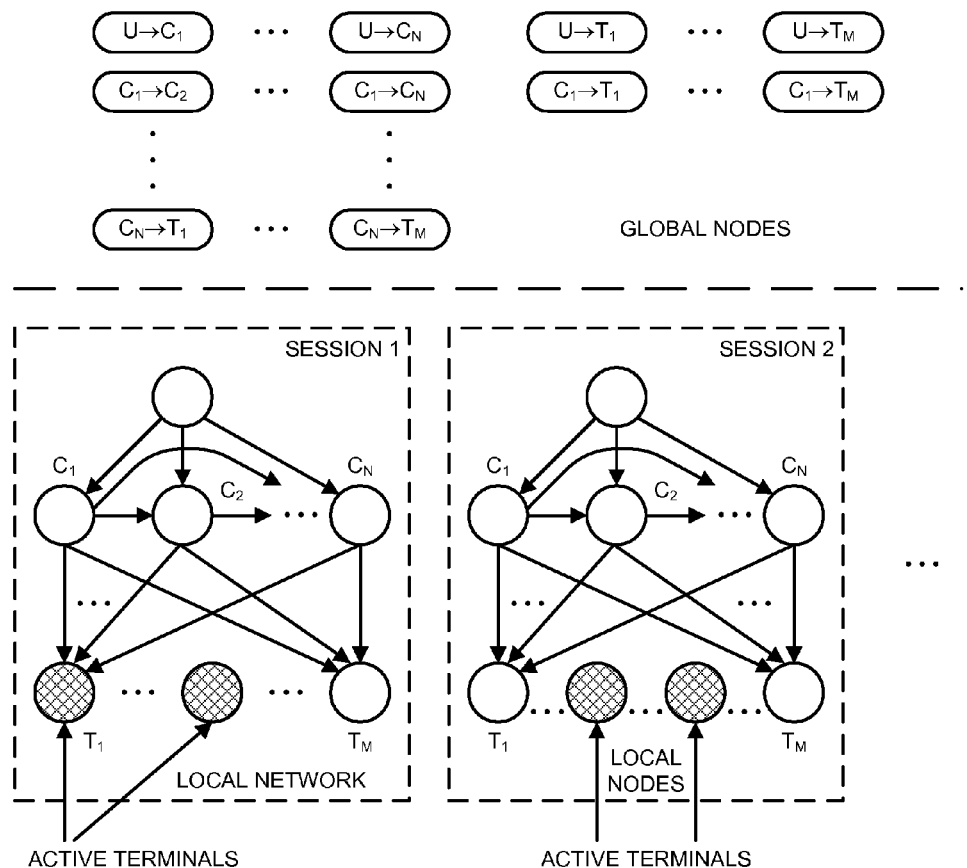
FIG. 4 illustrates global nodes and a number of local networks in accordance with an embodiment of the present invention.

FIG. 4 shows what this big network might look like. Above the dashed line are global nodes, they represent uncertainty about our model. The node $U \rightarrow C_1$ represents the uncertainty about the weight of the link between U and $C_1$ in the model (Recall that U is our name for the universal node that is always active). Similarly, so do the nodes $U \rightarrow T_1$, $C_1 \rightarrow C_2$, $C_1 \rightarrow T_1$, and so on. Note that our model does not allow everything to link to everything else. This is because in order to have a consistent explanation of ideas all coming from the Universe U, cycles in the link structure are not allowed—for example a concept $C_1$ that can cause $C_2$ that can cause $C_1$ and so on, makes $C_1$ and $C_2$ always likely even it U does not link to them. For this reason, a concept is only allowed to link to higher numbered concepts than itself and the universal concept can link to everyone.

Now, below the dashed line are the local networks. In each network, the terminals for a particular user session are assumed to be active. Note that our model is replicated for each such session. This is because what we observe for each session is only the words that the user used, and not in fact that concepts that were active in the user's mind when those words came about! The local nodes here represent our uncertainty about these concepts. Because the user may have been thinking of anything when they wrote each word they wrote, all concepts have to be considered in each local network.

Figure 5:
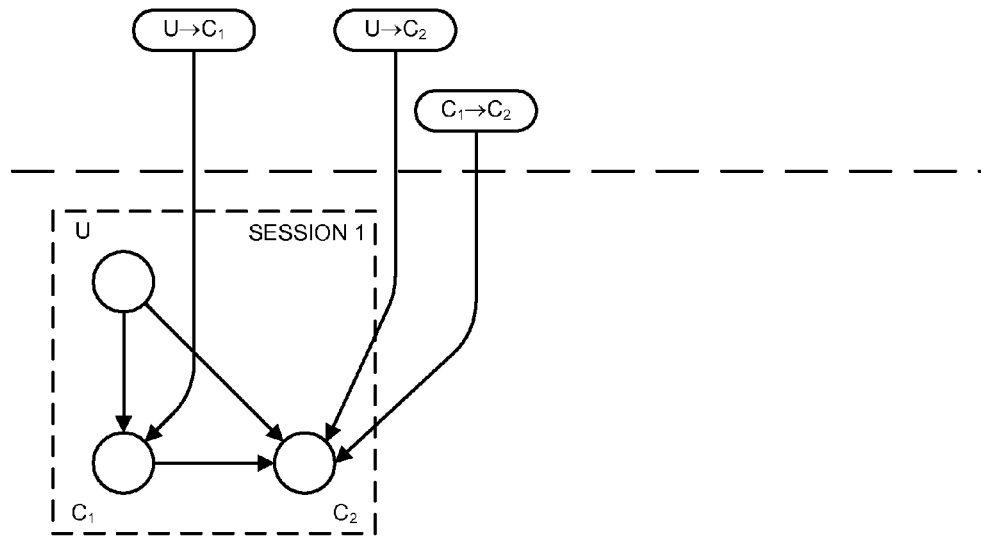
FIG. 5 illustrates an interaction between local network nodes and global model nodes.

Now, how do the local networks relate to the global nodes? Simply put, each link between U and $C_1$ in a local network is mediated by the global node ($U \rightarrow C_1$). The probability that U fires $C_1$ in each local network depends on the global node ($U \rightarrow C_1$). In a full probabilistic network drawing of the local networks of FIG. 4, each the global node ($U \rightarrow C_1$) would point to every $C_1$ in every local network. FIG. 5 shows this interaction with one such network because there was not enough space to do so in FIG. 4. Also, FIG. 5 only shows the interactions for a model with two concepts. The links here between the global node ($U \rightarrow C_1$) and $C_1$ represents the fact that $C_1$ needs to know both the status of U and the global node ($U \rightarrow C_1$) before it fires in a local session.

Figure 6:
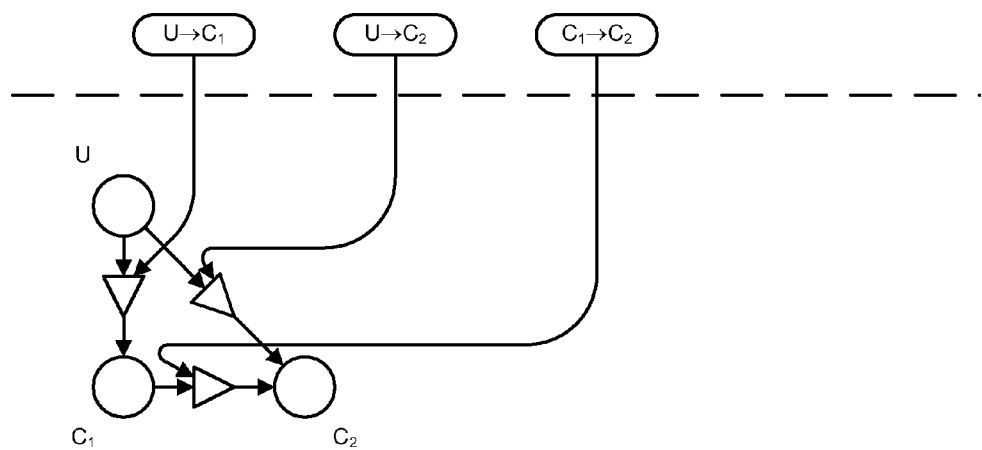
FIG. 6 illustrates a reworked model in accordance with an embodiment of the present invention.

FIG. 6 shows a slightly reworked version of this model, where variables exist to explicitly show whether or not each concept triggers another concept or terminal. Note that the joint distributions implied by both are the same, once they are projected to the original variables we are interested in (i.e. $C_1$ and $C_2$). The triangles in this figure represent extra "trigger" variables, and it is often helpful to think about the model with them because they simplify the number of conditional probabilities that are required.

For example, in FIG. 6, the "trigger" variable between U and $C_2$ only needs to know the distributions of U and the ($U \rightarrow C_2$) to decide the probability that $C_2$ gets fired from U. Similarly the other trigger into $C_2$ only needs to know the values of the $C_1$ and ($C_1 \rightarrow C_2$) distributions. These two joints are simpler than the joint over all 4 variables that the $C_2$ node would need in the FIG. 5 model. This is primarily because the complexity of a conditional probability specification rises exponentially with the number of elements it has to account for.

This point is worth making a little clearer. Imagine for example that a person enters a complex betting scheme where the outcome of the bet depends on 10 horse racing events, with each outcome providing a different payback. In order to communicate this bet, $2^{10}$ or 1024 numbers are required, because that is the number of distinct outcomes if all the races are considered simultaneously. Imagine now instead that the same person enters into 10 independent bets on each of the horses, winning or losing some depending on each horse. This bet now requires only 10 numbers to communicate. Similarly, when a conditional probability distribution has to account for N variables $2^N$ is the order of complexity required, and therefore the amount of computational complexity required to deal with such a state. This is why trigger variables are useful as a factoring of this problem. From this point onwards, we will show our local networks interchangeably in either triggered or non-triggered form.

One last thing is still necessary to specify in the big network so that it is probabilistically well defined. First, the global nodes require a prior distribution. That is, in order to combine evidence about how likely it would be that a concept links to a particular other concept or word, we need to know what our belief in that would be a priori. The learning of our model turns out not to be too sensitive to this distribution, so many things are possible here, including using a flat distribution of 1/1000 on the link being nonzero and 1/1000 on the link being nonzero.

This is a bit of an aside and a diversion, but or the sake of completeness let us mention here that this does not constrain the variables fully because no density is imposed on nonzero values, and it is only the product of activation that weight that matter for firing probability. However, heuristics that we use to pick the activation of a concept in a session imply that the total weight of firing from the concept to all terminals should roughly equal the average number of terminals this concept fires divided by the average number of words it can fire in each session. Also, another way to set these probabilities depends on the specific way in which inference on the global nodes happens. As it is, we look only for a simplified model where each global node is represented by a two spiked distribution, one at 0 and one at another best value. In this case, you can estimate the prior on a new link to be dependent roughly on the Kolmogorov complexity of the network given this new link, that is on how simple the model is with the new link, assuming in fact that the whole model in fact derives itself from an explanation of the world in which models are more likely if they are simpler. Here, a link from a cluster to a terminal could be more likely depending on the number of other things that the cluster links to, or the number of things that link to the terminal, or both.

Once the entire big network is set up, there is no more conceptual work to be done. Running inference on this network is fairly straightforward from a theoretical point of view, and given enough computational power, it is straightforward to arrive at all of the distributions of the global nodes, which fully specifies the model. Inference here means for accounting for all the training evidence (the user sessions) given, and fully being able to use the implications of that evidence on our model. The distribution over likely models in turn allows us to guess exactly at which concepts are active when certain pieces of text are active, and with which probability. In fact, the distribution over the model allows us to answer all questions about the generation of such text.

Only one problem remains, that of scale. The basic problem is as follows: let's say there are around 5 million concepts in the world (and that's small, consider that there are 6 billion people, and when talking about each of them, you might say different things so there are at least 5 billion concepts, but let's assume 5 million to start things out). Let's assume there are 1 million terminals (it turns out with compounds such as new-york, that's easy to get to, and that's only with English). Now, let's say we want to train this network on 5 billion user sessions. In addition, let us ignore the computational burden of dealing with continuous random variables (which is considerable). Note that the model nodes have to be replicated once for each session. This means that the full big network will have:

> 5 billion sessions×(1 million terminal local nodes+5 million concept local nodes)×=30 billion million local terminal nodes . . . and that's the easy part. Now let's count the links. The global model has 5 million nodes, each of which can link to 1 million terminals, each of which can be replicated in the local networks 5 billion times, each of which then has a link from the appropriate global nodes (that doubles the number) so that's:

> 1 million terminals×5 million clusters×5 billion sessions×2=50 million million billion links!

. . . and the worst part is that correct inference techniques run in exponential time over the size of the network, so basically, doing this the straightforward way is impossibly expensive. The next section of this disclosure discusses the different things that can and have to be done in order to make this system possible.

Scalability Techniques and Loopy Belief Propagation

The first problem we have in solving our large networks is that full inference is exponential in the size of the network. Here we take some shortcuts. There is an inference technique called "loopy belief propagation" (commonly called loopy) that propagates evidence around a probabilistic network in a rapid if incorrect manner. It has the advantage of being fast, but the disadvantage of being incorrect. It often however proves to be a good approximate solver for various belief networks.

Loopy belief propagation relies on two types of messages that are transmitted in a network in order to figure out the marginal distributions of all nodes in a particular network. Down messages are those that move with the flow of links, and they summarize for whatever node is on the other side of the link, the belief in the source given all other evidence other than what comes from the destination. Up messages move against the flow of the links and tell the destination node (which is also the parent in the probabilistic network sense) what the probability is of this side of the link, given various values of the destination node.

Figure 7A:
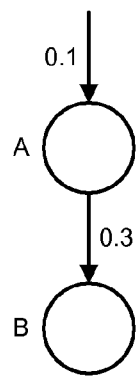
FIG. 7A illustrates a simple network with two boolean nodes in accordance with an embodiment of the present invention.

FIG. 7A displays a simple two boolean node network with noisy-or components. Here node A has prior 0.1 of being true, and B has 0.3 of being true given that A is true. Now we can determine the probability of B being true by running loopy on this network. A propagates a down message to B telling it that given all other evidence, A believes it itself is true with probability 0.1. B receives this message, and factors in the conditional probability (noisy-or) at itself, and concludes that it is true with probability 0.03, and we are done.

Figure 7B:
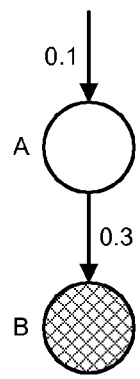
FIG. 7B illustrates how inference works in a simple network with two boolean nodes in accordance with an embodiment of the present invention.

FIG. 7B displays a two boolean node network that shows how inference works using up messages. Here, there is evidence on B that B is true. So, we are trying to determine the probability of A given that B is true. B sends an up message to A, this tells A that B can only be true if A is true: that is, given that A is false, the probability of the evidence from below that B knows about is 0. Therefore A must be true. A receives this message and multiplies it by its prior on itself, which has a 0.1 chance of being true, and concludes that it must be true and so therefore given the evidence, A is true.

Loopy belief propagation is not technically an exact solution to the inference problem for the following reason. When evidence arrives at a particular point from two different sources, they lose information about whether those sources are correlated. Imagine the following example. Three people A, B, C are involved in a conversation. A tells B that he believes the stock market will go up in the next month. B tells C the same information. At this point C tells A that someone else believes the stock market will rise. The problem with loopy is that with this simple belief propagation system, A cannot now tell that C's belief is in fact based on A's original assertion, and therefore evidence from A circulates back to itself. In a slightly more complex way, loopy belief propagation circulates evidence around loops in the network to create a usually accurate but sometimes inaccurate solution.

Figure 8:
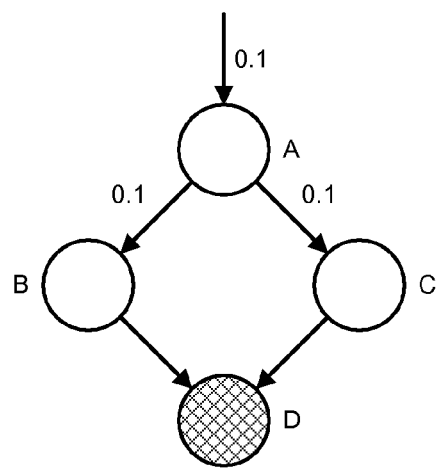
FIG. 8 illustrates a noisy-or network where loopy fails in accordance with an embodiment of the present invention.

When loopy runs on a network with no loops it is exact, and settles within a number of steps equal to the diameter of the network. When it runs however on a network with loops, evidence loops around the network. Usually it settles on a particular solution, but there is no guarantee that that solution is correct, or even that loopy ever settles at all. FIG. 8 in fact shows a noisy-or network where loopy fails. Here D is assumed true, and it's only source is really A, so inference should show that A is true. Loopy however settles on a value of approximately 0.6 for A. Usually, however, loopy works pretty well, and we will examine how it can be improved later on in the disclosure.

An additional point to mention here is that the effect of running loopy on this big network is largely equivalent to the notion of running an EM (expectation maximization) operation on the data considering the clusters to be hidden variables. In EM, an initial guess at the model variables is taken; then the probabilities of the hidden variables are inferred; then the guess for the model variables is updated. This is essentially the same computation as loopy. One difference between the two is that loopy does not reflect evidence from one session back at itself, i.e. a proper accounting of loopy would discount the down message from the global nodes for the previous up message that the session sent in the last iteration. There is not much difference between the loopy approach and running the EM approach on different pieces of data each iteration. In the remainder of this disclosure we will use the loopy nomenclature rather than the EM nomenclature in discussing this process.

Loopy Belief Propagation in the Big Network

Loopy messages are used across the global/local boundaries in the big network. Here the global nodes propagate down their beliefs in themselves to a particular local network—and since the network is just one of billions usually this is just the same belief propagated everywhere. Also however, the trigger nodes propagate up the probability of the network given everything else that is known about the trigger node.

Figure 9:
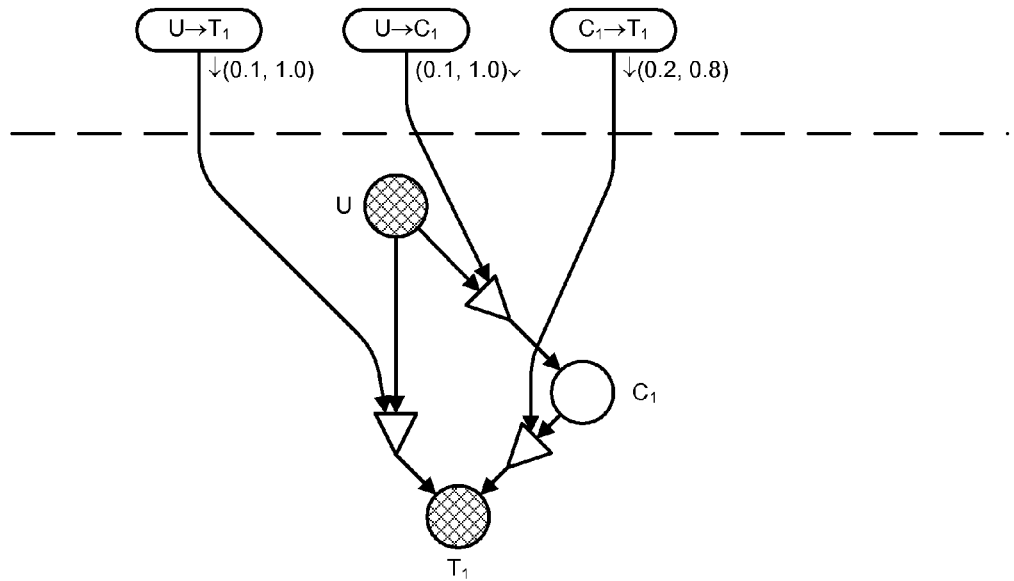
FIG. 9 illustrates a loopy computation inside a simple session in accordance with an embodiment of the present invention.

FIG. 9 shows the loopy computation happening inside a particularly simple session and with a model including only one concept ($C_1$) and one terminal ($T_1$). Note that in this session, we have seen the terminal $T_1$, that is why the local node is darkened. Now, let's take a look at what some of the messages surrounding this model are.

First, let's look at the down message that comes from the (U→$C_1$) global node to the Trigger node between U and $C_1$. This message has to report the current belief in the state of the (U→$C_1$) node, given the data it has digested in the current iteration of loopy from the other sessions. Communicating and computing with a complete and accurate distribution over a continuous variable would be prohibitive. For this reason, the down message from (U→$C_1$) to the trigger node in this session between U and $C_1$ is simplified. Instead of communicating a full distribution, it approximates the distribution with a two peaked discrete distribution, with one peak at 0 and another peak at a chosen "best value" W.

In figuring out this down message, our system first compiles evidence coming in from other sessions about this global node. Our system then picks a best nonzero value W for this node. It then translates the up messages into messages about the node's existence, allowing it to determine how much of the probability to send in the down message at the best value W and how much at the value 0. This simplification of the down message from global nodes is advantageous in dealing with the discrete-continuous nature of the global nodes in a computationally feasible manner.

The simplified down message from (U→$C_1$) is along the little arrow next to the link emanating from (U→$C_1$). It is labeled (0.1, 1.0). This means that the best value is 0.1, and with probability 1.0, this link exists. For reasons that we would like all networks to be partially explainable, we never let the links from U to anything have probability less than 1.0. Another example down message is the one emanating from ($C_1$→$T_1$) to the trigger node in between $C_1$ and $T_1$ in the local network. This message is labeled (0.2, 0.8) which means it has a 0.8 chance of being nonzero, and when it is nonzero, it equals 0.2.

Now, let's try to do some inference on this network, given that we know the down messages from the global model. There are three trigger nodes, one from $C_1$ to $T_1$, one from U to $C_1$ and one from U to $T_1$, whose probabilities we don't know. We also don't know the probability of the cluster $C_1$ being active within this session. All of these can be figured out by running loopy on this session. Before we run through a sample of these computations however, we will cover an additional simplification. The message down from ($C_1$→$T_1$) down to the trigger node is labeled (0.2, 0.8). However, before we use this message, we pretend it was actually a single message of (0.16, 1.0) by multiplying out the two spiked distribution and again simplifying it into a single spiked distribution. Now we are ready to look solely at the little session network. This simplification is also done within our framework.

One small assumption we can make is that the activation on $C_1$ is set to 1. Typically, in running probabilistic networks, this value can be derived itself through inference. However, while trying to do inference in these local networks, our model assumes that the activation of a cluster is equal to the number of terminals it could possibly fire in this network. This is the adjustment we talked above earlier that deals with the fact that only the product of the activation and weight mattered. This adjustment is made with the following justification, that the activation only matters to within an order of magnitude, and therefore, no computational time ought to be spent in determining it optimally.

Figure 10:
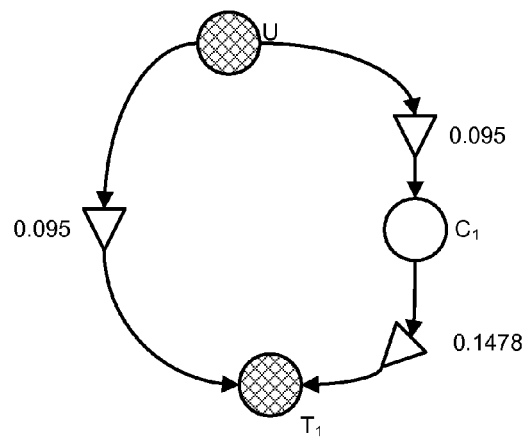
FIG. 10 illustrates a simplified local network in accordance with an embodiment of the present invention.

Now, we can look at a simplified noisy-or model of this network, while ignoring the global nodes. This is because all of the information the global nodes feed into the system can be summarized by the weights on the noisy-ors between clusters and other clusters or terminals. This is a standard technique in probabilistic networks of simplifying away nodes with no other parents by summing them into the network at hand. The simplified local network then looks like the one in FIG. 10. The links in this network are labeled 0.095, 0.095 and 0.1478. This is because the probability that U triggers $T_1$ is now equal to $1-e^{-0.1}$ which is 0.095. Recall earlier how we said that the link should trigger the resultant with probability approximately AW. Here A is 1 and W is 0.1, and this is approximately 0.095. The same applies on the link between $C_1$ and the trigger to $T_1$, which is 0.1478 which is $1-e^{-0.16}$ which is approximately 0.16.

Now, we know that $T_1$ is true. Let us determine how likely it is that $C_1$ caused it. The down message the trigger node from U sends to $T_1$ is (0.095, 0.905), where 0.095 represents the belief that the node is true and 0.905 represents the belief that the node is false. Note that the nature of this down message is totally different than that of the down message from a global node. This is because the trigger node is a boolean variable, whereas the global node is a strange mix of a continuous and discrete variable with some probability mass at 0 and some density at the other points, and further this is approximated by a two point distribution, then further simplified into a single point distribution.

Because the trigger is a boolean node, it need only send down its one number, the probability of it being true, the other number is just 1 minus the first number, and in our implementation, we do this optimization. $T_1$ takes this number and sends up to the trigger node on the $C_1$ side, the probability of $T_1$ given that the trigger triggered, versus the probability of $T_1$ given that the trigger did not trigger. This up message is (1.0, 0.095). Now normally, up messages for boolean variables have two such values, but really only one is needed, the ratio between the two (given that infinity is a representable number). Now, the trigger node from $C_1$ to $T_1$ gets an up message of (1.0, 0.095) but it also has a down message coming from $C_1$ above. This message is (0.095, 0.905) from $C_1$. Now, the trigger node has all the information it needs. It transforms the message from above into (0.095*0.1478, 1−0.095*0.1478) or (0.014, 0.986). This transformation means that it now has its own belief given what is above it. Now it multiplies that component-wise by its belief of what is below it to get (0.014*1.0, 0.986*0.095) or (0.014, 0.09367), then it normalizes this to sum to 1 to get (0.13, 0.87), which is its final belief. Similar computations can now be carried out to figure out all the other "hidden variables" in this network.

In general loopy gives a node a belief on its parents, and its children's belief on itself. It uses its conditional probability distribution to transform the belief on its parents to a belief on itself. It now has two belief numbers for itself, which it multiplies component-wise, then it normalizes to 1 to obtain its own belief. A couple of optimizations we often do in computing these messages are the following: we do many probability computations in log space in order to avoid underflows. This includes both the down messages and the up message ratios. In addition, in order to implement loopy so that it works in linear time in the number of parents on a node, it helps to be able to subtract out the effects of one parent from the belief of the node. This is done via a special routine that takes N numbers and computes all N products of N−1 of those numbers in order to do this propagation quickly.

Now let's take a look at the up messages sent up to the global nodes which are of a different nature. Recall that the global nodes are actually discrete-continuous random variables which can take any value from 0 to infinity. Let's work out a simple example which shows how you can compute the probability of a network given the weight on a link.

Figure 11:
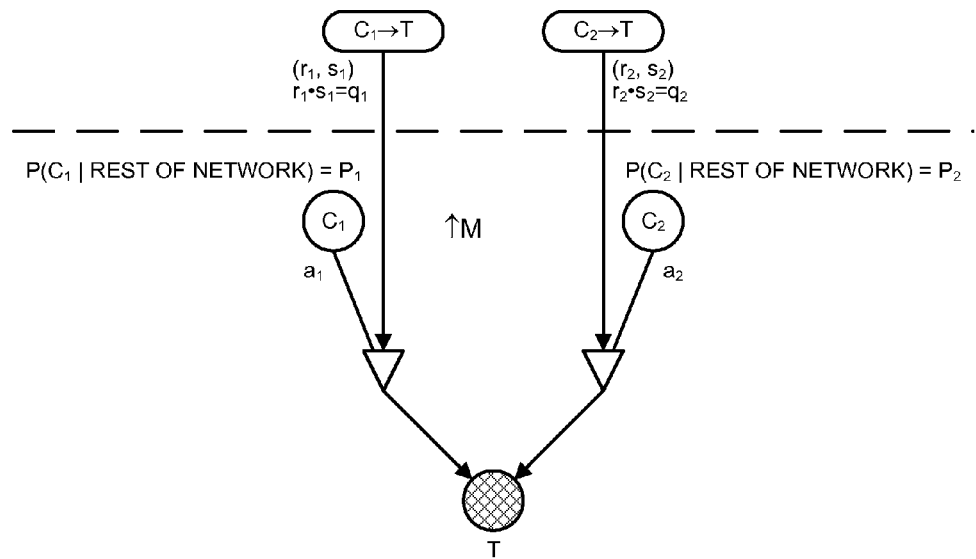
FIG. 11 illustrates two clusters competing to trigger a terminal in accordance with an embodiment of the present invention.

FIG. 11 shows two clusters $C_1$ and $C_2$ competing to trigger a terminal. The down messages from ($C_1$→T) and ($C_2$→T) to the appropriate trigger nodes indicate a firing probability of q1 and q2, respectively. Note that as mentioned above, we approximate the impact of the down message from a global node by multiplying its probability of existence times its best value, therefore, we approximate our solution by pretending that in the local network, $C_2$ can launch T with probability $1-e^{-a2q2}$, and similarly for $C_1$ launching T. Now the messages coming into $C_1$ from the other parts of the model show that it is p1 likely to be true. Similarly, messages coming into $C_2$ from other parts of the model show that it is p2 likely to be true. $C_1$ and $C_2$ are decided to have activations a1 and a2; and the node T is a terminal that has been observed.

Now, let's look at the up message sent along the link from $(C_1 \rightarrow T)$ to the trigger node in the local model between $C_1$ and T. This message is labeled M in the figure. This message can transmit the probability of the network as a function of q1. The actual probability of the network need not be sent. In fact, only the relative probability ratios need to be sent, i.e. any constant factor multiplied by the probability can be sent, so long as the factor is the same for all values of q1. Finally, we are prepared to investigate the message sent up.

There are four possibilities to account for in the network, each with their own probabilities for what happens outside this small network. The first is that both $C_1$ and $C_2$ are true. This happens with probability p1p2. In this case, the probability of T being true (the only remaining evidence in the network) is equal to:

$$1-e^{-a1q1}e^{-a2q2}$$

and therefore the whole network probability is, $$p1p2(1-e^{-a1q1}e^{-a2q2}).$$

If $C_1$ is true and $C_2$ is false, the probability of this happening is p1(1−p2). The probability of T being true is:

$$1-e^{-a1q1}$$

and therefore the whole network probability is, $$p1(1-p2)(1-e^{-a1q1}).$$

Similarly, if $C_2$ is true and $C_1$ is false the probability of the network is $$p2(1-p1)(1-e^{-a2q2})$$

And last, it is impossible that T is true if neither $C_1$ nor $C_2$ are true. Therefore, the function message sent up to the global node $(C_1 \rightarrow T)$ is:

$$p1p2(1-e^{-a1q1}e^{-a2q2})+$$

$$p1(1-p2)(1-e^{-a1q1})+$$

$$p2(1-p1)(1-e^{-a2q2}).$$

Although this function seems complicated it is actually pretty simple. Consider that the only variable in this function for the purpose of the message M is q1. Therefore, this function sums up into the following form:

$$a+be^{-a1q1}$$

... where a is the sum of all constant terms above and b is the coefficient of $e^{-a1q1}$ in the above sum. Note that q2, p1, p2 are all considered constant for the purpose of sending up a message to the node $(C_1 \rightarrow T)$. In fact, since the constant factor this function is multiplied by does not matter, this equation can be rewritten as:

$$1+ke^{-a1q1}$$

... leaving only two numbers to send up to the global model, k and a1. We refer to these up messages to the global nodes as link messages.

Now, the functional form of these up messages does not change much when the destination of the links is a cluster. For example, if T were a cluster, then the activations of $C_1$ and $C_2$ would not matter, whereas T might receive an up message from other terminals dictating whether it was likely to be true or not. This would simply add another set of conditions to the computation, because each world view would have to account for T either being false or T being true as well, and the sum above, instead of having four different parts, would have 8 parts, one for each possible value of $C_1$, $C_2$ and T. Now by sending up messages to the trigger nodes (which we have not simulated here), our code efficiently avoids the exponential blowup that a full consideration of T and all of its cluster parents would incur, which would be prohibitively expensive if T had more than a few parents.

One thing to note is that although we are running loopy across the entire network including the global nodes, we don't have to run the local and global iterations of loopy in lockstep. In fact, we often run tens or more iterations of loopy on each local network in order to converge it, before we return to running the one step of loopy on the global nodes.

Link Weight Optimization

Now, we are ready to consider how loopy treats global nodes; i.e. in each iteration of loopy, how our model reconsiders both the existence and the best value for each link in the model. Recall that the up messages to any global node are of the form:

$$1+ke^{-a1q1}.$$

Now, in order to select the most likely weight value for this variable, our model simply has to combine all these up messages and pick the best value for the global node. Let us change our notation a little for convenience. Say a node receives N up messages of the form $(1+k_i\exp(a_ix))$. Here we are using i as a subscript that goes from 1 to N. The $k_i$ are the constant factors, the $a_i$ are the coefficients on x, and x is the variable that is to be solved for X here represents a possible choice for the variable, while the function messages represent the probabilities of various sessions using different values for x.

In order to select the highest nonzero x, we simply have to find the x which maximizes the product of all of these up messages (which are also called link messages because they go to the global node that determines a link weight). This is a one-dimensional optimization problem. One way to solve this would be to sample x in a range. A more efficient way would note the following: the product of a bunch of numbers is optimized when the log of the product is optimized. The log of the product of these numbers is the sum of their logs. This leaves us optimizing, $$\sum_{i=1}^{N} \log(1+k_i e^{-a_i x}).$$

Now we can take the derivative of this with respect to x, and search for points in a particular range (say 0 to 1) where the derivative vanishes, for a local optimum. This search can be done by bisection or via any number of other techniques. This function can sometimes be non-monotonic (i.e. not always rising or falling), so sometimes this has more than one local optimum, but this is typically not always the case.

A small note here, why does this optimization not produce an optimal x of infinity or 0? The nature of the function $1+ke^{-ax}$ depends a lot on k. If k is positive, this function decreases for larger values of x. This means that this particular session is harmed by having this particular link be larger. Typically, this happens when a cluster points at another cluster that is not likely in probability to be indicated by the session. If k is negative, in particular around −1 then this indicates a strong reason to have this link. For example, assume k is −0.99. Then x being 0 implies a relative probability of 0.01. X being very high implies a relative probability of 1, therefore, x is 100 times as likely to be very high as it is to be 0. Sometimes however, it turns out that a value of 0 is the only local optimum. When that happens, our model puts all of the probability mass of the link at 0.

When the best value is chosen, the up messages then can be converted into up messages for a boolean existence variable, trading off the best value of X versus the value of 0. The product of probabilities above is simply evaluated at X and at 0, and the prior on the link's existence (1/1000 as above or as determined by Kolmogorov complexity) is mixed in. This mixing in gives us the existence probability for the link.

Pre-Compounding and the Lexicon

Our model deals with a finite set of words or compounds that it understands, which is referred to as a lexicon. A pre-processing phase is required to determine this lexicon. This preprocessing phase determines the important words and compounds for our model to be able to process. Roughly speaking, all words that are seen over a particular fraction of the time in user sessions are included. Compound inclusion is more complicated. Two strategies are possible here: 1) be more inclusive of the compounds and do run-time compounding 2) be less inclusive on the compounds and do static-time compounding.

The reason compounding is complicated is because of the notions of compounds itself. As we discussed above, if a set of words is basically non-compositional such as "new york" then it is a good compound. Another set, like "red car" is compositional, in that it is both red and a car. One way to discover this is to look at user session breaks and splits. We can count for each potential compound the number of times it is broken. A broken compound here means that in one query the user issued the whole compound, while in another query, the user issued part of the compound. For example, the following session has 2 breaks for red car:
red car
blue car
yellow car Splits are a similar concept, where the compound is split apart at either end. For a two-word compound a break is also a split but for a longer compound like "this is the time for all good men" a break could be seeing the words "the time" somewhere else in the session. Now, this information can be combined with information about the likelihood of the break to account for the possibility that the break is not intentional but accidental, for example, a user could see the following user session:
new york cars
new magazines
... and our model would conclude this was a break for "new york". However, since "new" is a relatively frequent word, the weight of a break, or how significant our model believes it to be should be weighted by how common the word is. All of this information, the compound's frequency, the frequency of both breaks and splits, and the term frequency of the split or break words, is used in determining an appropriate set of compounds for the lexicon. It is not necessary for this lexicon to be based on user sessions, in fact any manner of text, including web documents, books and so on can be used to form an appropriate compounding lexicon.

In the static compounding approach our model takes the frequencies of the words and compounds in the lexicon, and uses them to pre-compound the text. In this case, each sequence is explained using a dynamic programming approach that tries to maximize the probability of seeing a sequence of tokens from the lexicon. The dynamic programming approach is to run across the length of a piece of text and maximally explain the sequence of tokens seen so far. At each point, if we know the best explanation of the sequence up to each new word, then one of two things is possible: (1) either the word is explained by its own lexicon token, and all the other words before are explained by their best explanation to that point or (2) the word is a part of a compound that mixes with the best explanation of the query up to a number of tokens previous. Both of these alternatives can be explored, and a new best explanation for the session up to that point can be generated. By running this operation as we see each new word in a set of words.

Figure 12:
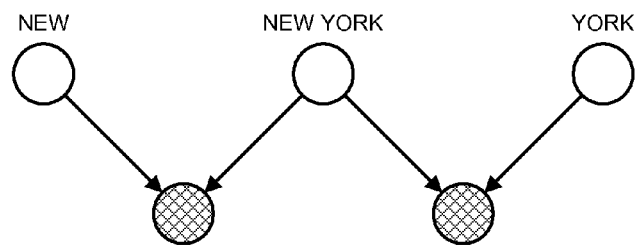
FIG. 12 illustrates how a local probabilistic network can deal dynamically with compounds in the lexicon at run-time in accordance with an embodiment of the present invention.

In the dynamic compounding case, evidence in the session is taken to be evidence on an OR of possible word solutions that occur at each position within the session. FIG. 12 shows how a local probabilistic network can deal dynamically with compounds in the lexicon at run-time. When a session consisting solely of the words "new york" is seen, evidence is not counted for the words new, york, or even new york. Rather, we see that at the first position, either the word "new" or the compound "new york" would explain that position. Similarly, either "york" or "new york" explains the second position as well. All of the messages we discussed in the previous section are fairly easy to adjust to this new compounding method. In fact, this method has the advantage of being able to decide whether or not a pair of words is a compound based on the other words in the session.

Sparseness and Initialization

Whereas the description of our model above for the most part assumes an arbitrarily large number of concepts, this need not be the way the technique is initialized. In fact, our model starts out with only one particular cluster, the universal cluster, U, which is also referred to for only mnemonic reasons as CANADA (note that this is different than the country of Canada).

Loopy belief propagation is an iterative approach, and so there is always time in its running to introduce new potential clusters, and this is what our model does. At each iteration, our model takes a number of user sessions and examines the words in the sessions. If a session contains a sufficient number of words, then a new cluster is formed that perfectly explains that particular session. This new cluster introduces a large number of potential model nodes—one for each potential model link in or out of this new cluster. Not all of these are stored either, in fact, our model only stores a particular link if the link optimization phase determines that it is more likely than a particular threshold to be existent, AND it's weight is sufficiently larger than the weight of a link from CANADA. This is to remove spurious links from the model, because as we will see they cost both memory and computational resources. This simplification will be referred to as "model sparseness".

A similar sparseness is imposed on the local network. Even at the beginning, with a lexicon of 5 million words and compounds, local sessions would be particularly large. There is really no reason to involve every terminal and compound in each local network. We can summarize the effect of having observed all words and compounds not in the text to be false. This is done by pre-computing for each concept the probability that it fires no words. This can be done after a link optimization phase (more on our model's phases later). This precomputation can be adjusted by removing the effect of the words that are actually in the text. That is, instead of additively determining the effect of all nonexistent words, we compute once for each cluster the probabilistic costs of it triggering no words, and subtractively remove the effects of the words that are already there.

This "terminal sparseness" removes all but a few terminals from each local session, and summarizes them with some evidence for each concept pointing at a "false" boolean node with a determined weight (that weight being determined by the probability of firing nothing divided by the probabilities of it firing the terminals actually in the session).

In addition, when sending up messages to the global nodes, the effects of all of the nonexistent terminals is summarized. Normally, if a cluster $C_1$ exists in a session with only one word $T_1$, we would need an up message (with a positive k as above!) relating that the probability of the network would be reduced for a link between $C_1$ and $C_2$, and $C_1$ and $C_3$ and $C_1$ and $T_2$ and $C_1$ and $T_3$ and so on. There would be millions of these up messages. Instead, we summarize this with one up message. This process is part of a set of techniques for "link message sparseness". Let us examine how this is done.

Figure 13:
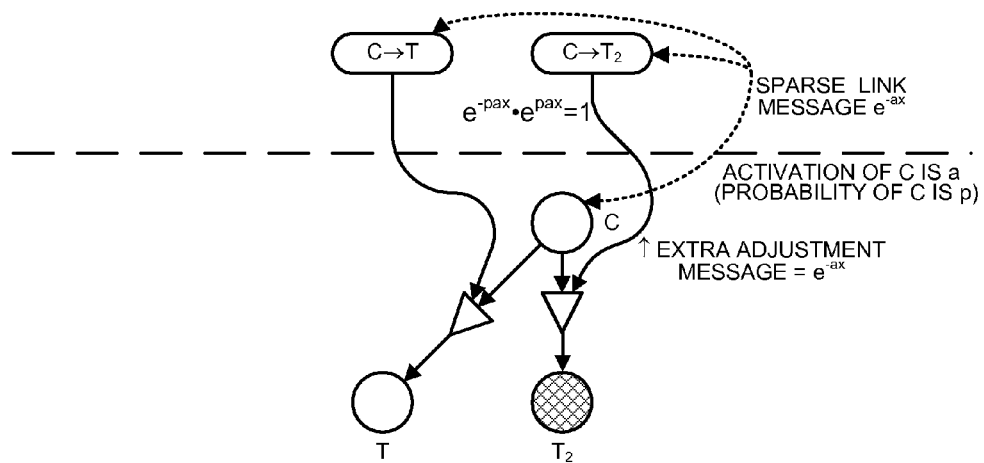
FIG. 13 illustrates how a single cluster C issues a virtual message to global nodes via "terminal sparseness" in accordance with an embodiment of the present invention.

In FIG. 13 we see a single cluster C, with probability p of being true as determined by the rest of the network. In this session, C has activation a. Now, the terminal T is not observed. It is to be excluded in the session via "terminal sparseness". Let's say x is value of the (C→T) node. The up message along the link from the (C→T) node to the trigger node between C and T communicates the probability of the network given x. Now, the probability of T being false is approximately:

$$P(C \text{ is true}|\text{all else})*P(T \text{ is false}|C \text{ is true})+P(C \text{ is false}|\text{all else})*P(T \text{ is false}|C \text{ is false})=pe^{-ax}+(1-p)\cong p(1-ax)+1-p=1-pax\cong e^{-pax}$$

Here we are assuming that the link strength x is low which seems reasonable because the cluster is there but the word is not. With a low link strength $e^{-ax} \cong (1-ax)$. Also to do this computation exactly, we would have to adjust for the fact that we initially computed the probability of C assuming this word was not there, which has to get discounted for in the loopy determination of this particular up message. The reason we don't do this, is that ignoring this fact allows us to send up only one number for the existence of the cluster C in this piece of text. This information—the product $e^{-pax}$—is then factored into all link optimization computations on model nodes that have C as a source, i.e. the (C→T) global node uses this number to approximate the effect of its optimal value on the probability of this network.

One small error introduced here is that because these messages are sent per cluster, we also consider them for combinations of cluster and terminal where the terminal actually occurs in the text! For example, in FIG. 13, the sparse link message that C sends up would get used in figuring out the optimal setting of the global (C→T) node. This is correct. But it would also be used to compute the optimal value of the (C→$T_2$) node, which is incorrect as $T_2$ actually occurs in the text! In order to adjust for this, the trigger node between $T_2$ and C includes an extra component in its link message. This adjustment of $e^{pax}$ is transmitted along with the normal link message for to the (C→$T_2$) global node. This cancels out the $e^{-pax}$ coming from the sparse link message and all the computations complete approximately correctly.

Thus far, we have simplified away terminals that are not there, and link messages up from their trigger nodes. There are still potentially in a big model millions of cluster nodes to deal with in each local network. In order to simplify this, we do a fast approximate calculation that allows us to determine which clusters are likely to exist with any probability in the session. It turns out that for the purposes of the global messages needed for learning, clusters that turn out not to be likely have little impact on the global model once the universe's sparse link messages are accounted for. Therefore, a quick computation that allowed our model to just not consider a large number of clusters would be extremely advantageous.

Our model runs a routine called "parent picking" to determine which clusters to even consider within a local network. This routine uses a few types of information (1) the a priori likelihood of the cluster which can be estimated from its probability in all other sessions (2) the words in the session, which generate likelihood for the clusters that point at them (3) the words linked from the cluster with high probability and (4) the structure of the global model. We will return to and examine this routine later but for the moment note that after running this routine on a small piece of text, if typically reduces the numbers of clusters to be examined by large factors. In one large model with a million plus concepts, and running on the session consisting of the single word "office" our model ends up considering only 12 out of the million plus clusters. This "cluster sparseness" also greatly reduces the amount of work required to analyze a session.

Figure 14:
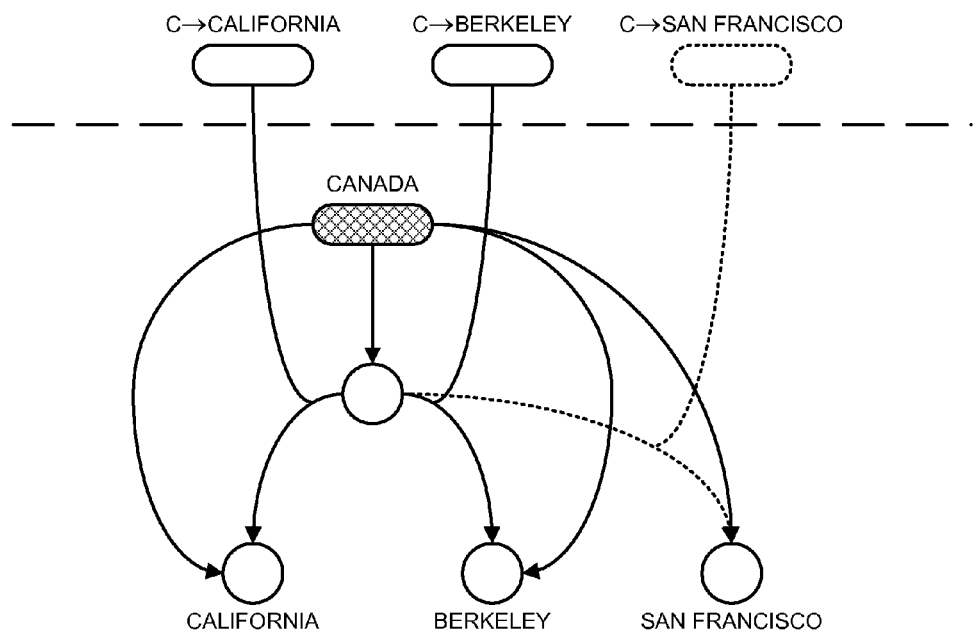
FIG. 14 illustrates how a sparse link message gets used in figuring out the optimal setting of a new global node in accordance with an embodiment of the present invention.

Note that up messages have to be sent not just for the links that already exist with high probability in the current iteration. One embodiment of our model needs to send up messages also relating concepts to new words, in fact this is how new words become linked from a concept. Consider for example that the initial allocation of a cluster C is to a query session:
california
palo alto
berkeley
Now as we are training on a new local network, we observe the session:
california
berkeley
san francisco FIG. 14 shows what such a network might look like (here we have eliminated the trigger nodes for aesthetic reasons). Our new cluster C points to both california and berkeley in this session. Note that using terminal sparseness all other terminals are not considered explicitly, and similarly using cluster sparseness. Also, because of not storing in the model links that are low probability, there is no explicit link between C and San Francisco (that is why there is a dotted line between them). Note also that the global node (C→San Francisco) also does not explicitly exist because of model sparseness. Now, if C is determined to be probable in the session, it is advantageous to send an up message to the node (C→San Francisco) which does not exist. When our model receives this message, it computes an optimal value for the (C→San Francisco) link, and if the link is significant enough (it both exists and has high enough best value) a (C→San Francisco) node is added to the global model. This is precisely how the global model grows new links from clusters to terminals. However, one optimization that can be done is to only send these new-node link messages up if the cluster has a high enough probability after locally running loopy.

The effect of these sparseness techniques is fairly important. Their essence is the combination of multiple messages into summary messages, and the sparse representation of virtually nonexistent information that can be largely ignored.

Model Storage and Compression

At this point, we have gone over many of the theoretical details surrounding both the specification of our model as well as the some of the sparseness techniques that are used to make our model practical. This section covers the execution of our model, that is the precise set of steps and processes which execute on the above theoretical model. There are still important theoretical introductions in this session however because only in the view of the actual running of our model are some transient effects explainable.

Our model is able to be run in parallel on separate computational units which exchange data using a shared file system or a network. A stage in its operation is said to be "sharded" if it can be split up in a way such as to make this parallelism possible. Data is said to be "sharded" in the same way (for example, often we say a file is sharded by id, this means that it is split into N pieces, and data with a certain id is placed in the id mod N piece).

Components Stored

First, we begin by covering the components of the information that our model can store from one iteration to the next in order to enable it to learn.

User sessions are stored as one or more files in the file system. Their format is such that a lexicon lookup has already transformed each recognized word into a unique integer, which is its terminal_id. The Lexicon allows terminal_ids to be transformed back and forth from strings of text to small ids. One advantage of using ids is that they are placed in a small dense space and so can often simplify the data structures that are used to manipulate them.

The Lexicon is stored in a format that enables easy translation from terminal_id to terminal, and back. Each terminal has a unique terminal_id.

Our model can be stored with all of the relevant link relationships, be they from cluster to terminal or cluster to cluster. The source of each link is referred to as the parent, and the destination a child. Each link between a parent and a child can be stored. In our model, this information is stored in an inverted index, sharded by child_id. Each cluster as it is created, is given its own cluster_id. This id may live in the same space as the terminal_ids. The inverted index stores for each child, the list of parents of that child, as well as their existence probabilities, and their weights. All of this information is bit-encoded using compressive techniques such as rice encodings, in order to reduce the amount of space that the index takes in memory.

One particular optimization is to store the inverted index data in blocks of doubling sizes, where within each block the parents are stored in id order for compression. The inter-block ordering can then be chosen to emphasize the important links for a target first. The advantage of this data structure is the most important links into a terminal or cluster can be retrieved without exploring the whole index entry. This of course can be done simply by sorting by importance. The second advantage is that large portions of the index entry are sorted by id, making it more compressive than a simple sort by importance.

The model may also be stored in an inverted order, with parents having lists of children. This may be used for debugging information. The model may also be separated into separate index and data structures, where the index here is a pointer index into the file so that the parents (or children) of a cluster or terminal can be found with two file accesses.

In order to redo the link optimization for the next iteration, and for parent picking, our model keeps around various pieces of information such as (1) the probability of each cluster given no other information about the session. This approximated as the frequency of that cluster over the last iteration of loopy (2) the total sum activation times probability for each cluster. This is used for the virtual link messages in the link optimization. This information is sometimes called the order one information or model, because it is an order 1 (no correlation accounted for) model of whether a cluster exists or not, and of its expected activation times probability.

The model can also store all of the outlink sums for all clusters. Here an outlink is a link from a cluster to another cluster. This is summed up by multiplying the current existence value of the link times its weight. The model can also store all of its activated outlink sums. This is the sum of links from the cluster to terminals. These two pieces of information are needed to figure out how to adjust the cluster's probability in response to only implicitly considering some of its children terminals or clusters—for example when using cluster or terminal sparseness. This data is also sharded by cluster_id.

The model may optionally store a list of cluster names in a file. These names are typically decided on by choosing a few of the more prominent terminals in the cluster and concatenating them. This is largely a mnemonic device for compounding. However, it can also be used to identify via a terminal the current cluster in our model that responds to a particular information need. For example, a set of pornographic words may be used to identify pornographic clusters, which can easily be then used in combination with our model to form a search safe for children.

The up link messages are stored temporarily in the processing of the next iteration. These messages are sharded by a combination of parent and child id.

The above covers the data requirements of our model while it is running, the next section details the different steps in the running of our model.

(1) Process Sessions

First, our model is loaded largely into memory to save file system accesses. Second, our model reads training sessions from a file system. It forms local networks for those sessions using the sparseness principles above. It then runs inference (loopy) on the local sessions, because that is required to settle on the probabilities of the various clusters, which is important for extracting link messages (as detailed above).

After running inference, our model extracts up link messages from those sessions and saves those messages sharded by (source_id, target_id) of the message. It also extracts "node messages" from the sessions. These node messages contain the current probability and activation of both clusters and terminals (terminals always have an activation of 1). This information is saved to the file system sharded by id to be processed by a later phase. Note now that this information for each cluster is exactly what is needed to adjust for the effect of "link message sparseness", i.e. it contains, in the parlance of FIG. 13, precisely the "a" and "p" necessary to recreate an $e^{-pax}$ message at any global node with source C.

During this phase, our model also decides on which of its sessions it can base new clusters off of. For each of these sessions, our model creates a "new cluster message" that records the likely terminals and clusters. The new cluster will be intended to point at the terminals and be pointed at by the clusters involved. These "new cluster messages" are stored in the file system sharded by id for the "process new clusters" phase to process.

This phase is sharded by session. This means that the input can be broken up into many pieces (shards), and each processing unit can handle only one particular set of sessions. Note that the sharding of the input (by sessions) is different than the sharding of the output. Consider for example if there are N input session shards, and M output node shards for the node messages (sharded by cluster id) and L output shards for the link messages (by target id, source id). The output of this stage is then MN node message files sharded by both the session shard and cluster id shard. This data is then merged together N ways to produce the M cluster id shards. A similar process occurs for the link shards as well. In general, when a phase shards by a different method than its output, its partial files are merged to obtain a result sharded by what the next stage expects.

As an example, take a process that takes in data on users by the days of the week, but produces data sharded by the first letter of the last name of the user. It's input is 7 files, one for Monday, Tuesday, Wednesday, Thursday, Friday, Saturday and Sunday. Its eventual output is to be 26 files, one for each letter of the alphabet. However, first, each of the 7 processes produces its own 26 files, resulting in 182 files. There is for example the "monday-a" file, the "monday-b" file (and so on . . . ) the "tuesday-a'" file (and so on . . . ) Now, all 7 of the "a" files, are combined into one "a" file, and similarly for all the other letters of the alphabet, until only 26 files result.

This "cross product merge" is one way of dealing with input that is sharded differently from what is output. It is a very efficient way of generating data in parallel, to be consumed by further processes in parallel as well. An alternative to it would be to simply use the file system and append all the data simultaneously to the output shards. This tends to be slower when large amounts of data are appended and the source sharding is large.

(2) Compute O1

Here, the probability sum of the clusters, and the sum of the activation times probability of the clusters is determined. This information is simply a summary of "node messages" produced in the process sessions phase. This information is saved to the file system as a new set of "summarized node messages" sharded by id and is part of our model. This information is referred to as the order one model.

This phase is sharded by node id (here node can be either a terminal or a cluster). This means that each processing unit is responsible for computing the order one model for only part of the data, which in fact is the part that it outputs data for; so no cross-product merge is necessary.

(3) Process New Clusters

This phase takes the new cluster messages, and decides how the new clusters will fit into our model. This decision is delayed until this time, because it requires information computed in the O1 phase. This is for an important dynamic theoretical reason. When a new cluster is introduced a decision can be made on the likelihood and best values of all links into it. Typically, such a cluster will be linked from CANADA as well as the other links in the "new cluster message" it is based off of If the new cluster is given links that are too strong (high weight and likelihood) it will immediately take over words from existing good clusters, without learning new concepts. This is because the cluster does not yet point to a properly related set of terminals. If the new cluster is given links that are too weak, it will not be important enough to make a difference in any sessions, and it will not receive strong enough link messages, and it will fail as well. Here failing means that the link messages it receives eliminate links from/ to it and the rest of the model.

In order to make the decision of how strong these links should be, we consider how often in probability each of its potential parents will fire. This is precisely the information present in the order one model computed above. In order to make this decision judiciously, we balance the link likelihood and weight in order to expect a small number M (usually 100) of expected occurrences of this cluster in the next iteration.

The output of this phase is a set of "entry messages". Entry messages are basically what exists in the inverted index information of the model. An entry contains information about a source, target, likelihood of existence and best value. This information is sharded by target id.

This phase is sharded by the cluster id of the new cluster. That is, each processing unit produces entry messages for only certain of the new cluster ids. Note since the different processing units may be producing data that is destined (by target id) for the same shard, they have to append their data asynchronously to some of the same files using the file system. A cross product merge could be used here as well but the quantity of the data is fairly small, so the data is just merged immediately at the file system level.

(4) Optimize Links

This phase receives all the link messages from the process sessions phase, and all the summarized node messages, and optimizes the likelihood and probability of the links in the manner described above in the link optimization section. Its output is again a set of "entry messages" sharded by target id.

This phase is sharded by a combination of source and target id. That is, each processing unit is responsible for only those links that fall within its sharding space. The resulting data is fairly small, and need not go through a cross product merge, it can be appended to a set of files in parallel from all the sources.

(5) Build Parent Index

This phase takes all the entry messages and puts them together for one particular target. This phase also limits the number of sources that may point to a particular target to a set number N. Typical values for N are 100 or so. The N sources that get to point to the target are the most important ones for the target. Importance here is determined by the product of the of value for the source, and the link weight and link likelihood along that link. This simplification is done to keep the number of parents pointing at a particular node small, for reasons of efficiency. This is yet another scalability technique, which we will refer to as "row sparseness".

The output of this phase is a particular shard of the inverted indices for the model files described above. The output is sharded by target id, the same way as the input. This entire phase is sharded by target id as well.

(6) Build Child Index

This phase inverts the parent index data to build a child index. It's input is sharded by the target of a link, its output is instead sharded by the source. Each processing unit appends to a number of result files in parallel.

The above describes the steps of running one iteration of loopy belief propagation to refine a model. This process repeats as necessary to obtain a better model.

Renumbering

There is a special step called "renumbering" that occurs every few iterations. Recall that a cluster $C_1$ may link to a cluster $C_2$ but not vice versa. In general, a cluster of id=i may link to a cluster of id=j if and only if i is less than j. It is desirable for the larger clusters to link to the smaller ones, in order to learn specialization and generalization relationships. Since concepts usually have more specializations than generalizations, it therefore makes sense to place the larger clusters earlier in the id space. This is unfortunately not necessarily the order in which they are learned. For this reason, we sometimes (every few iterations) renumber all of the clusters.

Renumbering the clusters means changing the link weights and likelihoods on almost all links. The way this occurs is as follows. Say a cluster A points to a cluster B with weight w. Furthermore, let the sum probability of A and B be p1 and p2 respectively (this is one of the components of the o1 model). Now, we expect A to show up in approximately a fraction p1 of the sessions, B in a fraction p2 of the sessions and both A AND B to show up in a fraction (p1 w) of the sessions. These numbers are all approximations of course. A reasonable approach to making B point to A would be to keep the same number of expected joint occurrences. This is achieved with a new link weight w' satisfying:

$$w'p2 = w\,p1$$

or $$W' = w\,p1/p2$$

In order to do this, a particular model is translated into "entry messages", the order one parts of the model are loaded into memory (they are required for the p1 and p2 components); and this translation takes place. The output of the translation is a set of entry messages that then feeds into the "build parent index" phase of the regular operation.

Parent Picking (Choosing Candidate Clusters)

When analyzing a session, one embodiment of the present invention does not include all of the thousands of clusters in the local belief network which we solve. We first determine which clusters are remotely likely to be active, and assume that the rest are off. We call the clusters that we consider the "candidate clusters". To determine which clusters are to be candidates, we keep a priority queue of clusters to be evaluated, so as to evaluate them in increasing order of height in the model (decreasing cluster id, increasing generality). We add to that queue all parents of the terminals for the session. We then begin popping clusters off of the queue and evaluating them. For a given cluster $C_1$, we construct a belief network as shown in FIG. 15.1. We include a $C_1$ and all terminals in the session linked to by $C_1$. We weight the links between these nodes as if $C_1$ had activation equal to some constant (we use 3.0). We add a link to the terminal from nowhere with weights equal to the o1 model of the terminal multiplied by the number of words in the session. This link approximately summarizes the chance that the terminal is caused by something else. We add a link from nowhere into $C_1$ with weight equal to the o1 model of $C_1$. We then solve this network to get a probability on $C_1$. Since the network is a tree, we can solve it quickly. If the probability of $C_1$ in the network exceeds a certain threshold (we use 0.05), we decide that $C_1$ is a candidate cluster. In this case we add all parents of $C_1$ to the queue of clusters to be evaluated.

In the case where we are evaluating a cluster $C_2$, which has as a child another cluster $C_1$ which we have already made a candidate cluster, we want to include the network we created for $C_1$ in the network we create for $C_2$, to add appropriate extra evidence on $C_2$. The danger in such an inclusion is that it will create loops in the network. We therefore will only add terminals and cluster children to the network for $C_2$ such that the terminals and the sub-networks corresponding to the clusters are all disjoint. In choosing which ones to include, we choose greedily in order of the strength of the message that will be sent to $C_2$. For example, if cluster $C_2$ linked to the terminals "grey" and "mouse" in the session and also to cluster $C_1$, we could either construct a network like in FIG. 15.2A which includes $C_1$, or one like in FIG. 15.2B which includes the link from $C_2$ to "grey". We would choose which one to construct depending on which message was stronger, the one from $C_1$ to $C_2$ or the one from "grey" to $C_2$.

In practice, data structures corresponding to these networks need not be constructed. When we make $C_1$ a candidate cluster and we are adding its parent $C_2$ to the queue of clusters to be evaluated, we can add a message as well specifying the message that would be passed from $C_1$ to $C_2$ if $C_1$ were included in the network for $C_2$, and the set of nodes in the tree rooted at $C_1$ (to avoid intersection with other elements of the network for $C_2$). Similar messages are also added when adding to the queue the parents of the terminals in the session. All of the computation can be done in terms of these messages.

Differential Text Source Adjustment Techniques

We have been discussing our model in the context of query sessions. However, as pointed out at the beginning of the disclosure, our model can be run on any source of text, such as web documents. One interesting technique we have developed is in training our model on one source of data, while applying it on another source.

For example, we can train our model on user queries, but apply the trained model to predict the probability of existence of various clusters in web pages. This is sometimes problematic, because certain words such as verbs occur much more in documents that in user queries which tend to have many more nouns. Unfortunately, in queries, many verbs occur in song lyrics, and often, a query-trained model will identify most documents to be partly about song lyrics!

A fix for this is to change the weight of the links from CANADA to all terminals to reflect their probability in the candidate language (i.e. the language of web pages). Because an explanation from CANADA for a terminal is basically a statement that there is no well-defined concept that originated that terminal, this ends up discounting the effect of those words somewhat. This often results in a better concept engine for comparing the concepts in queries and web pages.

Another small fix that can be applied deals with the independence assumptions that are helpful to have in training text. Large numbers of web pages are copies of each other, cut and pasted into different web servers. Training our model on all of these together is a little bit wasteful as it ends up learning exactly the repeated copies, without any of the hidden meaning behind them. In order to reduce this problem, one can eliminate all repeated runs of say N or more words (N is typically 10 or so) from a large set of documents. This can be done by fingerprinting all sequences of N words, sorting the fingerprints so as to group them, then iterating back over the training text removing words that are at the start of a 10 word run that is seen more than once. This technique has been applied with our model when training on web pages.

Demonstration

At this point, let's take a look at some output from our model in FIG. 16. Let's look at the information below the line "Model of 1378939 clusters". The data is in a two-column format. The left hand column reports the o1 model for a cluster, i.e. the sum of its probability of existence in all sessions in the last iteration of our model. The right hand is our current name for the cluster. Since CANADA (the universal node) exists in all sessions, the number 595417600 is also the number of user sessions this model was trained on.

Let's take a look at the next cluster. It is labeled [john david mark paul michael scott]. This is a cluster of first names. The following cluster [free sex porn pics movies xxx] is a cluster of pornographic words. The following cluster [uk england london in-the-uk ltd friends-reunited] focuses on UK content. A quick reminder that although this model was run on a group of English queries, nothing in our model is restrictive in terms of language, similar models can easily be built in any other language. The next cluster is [pictures of picture photos pics images]. Note that this cluster is interesting, because it seems to be labeled by some of the many different ways of asking for pictures on the web. In fact, this is exactly what our model was intended to do, to group together words by topic!

There are approximately 1.3 million of these topics. Only a few (the largest) are displayed in FIG. 16. Now, let's take a closer look at one of the clusters. The one with a count of 6408187 is labeled [jobs job employment in job-search careers]. An HTML interface has been provided with our model, and selecting that cluster brings up more detailed information about the cluster. This more detailed information is in FIG. 17. We will be reviewing first the information below the horizontal line (we will return to the search box later).

There are three main sections here, one labeled PARENTS, one labeled CHILDREN and one that starts with "ID 4737501". The PARENTS and CHILDREN section list the other clusters that this cluster is related to. The column on the left lists the number of times that a parent is expected to trigger, or a child is triggered by, this particular cluster. The parent information here is sparse, only CANADA is a parent of this cluster, and this is because the concept of jobs is so large that renumbering moves it quickly to be a parent of many other concepts.

Now let's look at the children information. Note that the children triggered most often are at the bottom of the list. The child concept [in jobs for india it bangalore] is expected to be triggered 378070 times from this jobs cluster. This sub-cluster is people in India searching for jobs! The next sub-cluster is [programs degree program education online masters] which talks about education. This means that when people talk about jobs, they often talk about education! The next cluster if about [salary salaries average salary-survey wages pay] salaries! and so on . . . . Our model contains an interesting amount of information about the world in that it determines that jobs are often related to education and salaries and pay! The numbers that follow the child clusters, for example (0.0608101,inf), are a pair detailing the best value of the link between the two clusters, and the logodds belief in the links' existence, which in this case is infinite so the link is there with probability 1.0 according to our model.

Now let's look at the information starting with ID 4737501. This means that this job cluster's id is 4737501. Its "Total Firing: 6408187.000000" means that the sum probability of existence of this cluster (o1) was 6408187 times in the last iteration of our model. Firing is sometimes used as a synonym here for probability or sum of probabilities. Its "Total Activation: 11139140.000000" is the order one entry for the sum of the cluster's activation times its probability in all sessions in the last iteration (it should really be called Total Activation Times Probability but that name is unwieldy). It's "Outlink Sum: 0.848506" means the sum of the weight times likelihood of its links to clusters is 0.848506. It's "Activated Outlink Sum: 0.521899" means that the sum of its weight times likelihood to terminals is 0.521899. Now the information below that is again in two-column format. In a similar way to the CHILDREN and PARENTS section, the next section details the links between this cluster and terminals.

The first terminal is "jobs". The information on the left, 1841287, is the number of times this cluster triggers the word "jobs". The information to the right of the word is again its best value and log likelihood of existence. The next few words are "job", "employment", "in", "job-search", "careers", "it", "career", "job-opportunities", "human-resources", and so on. All of these terminals are used when people talk about the concept of jobs! Note that many more terminals are linked to from this cluster, and only the most significant ones are displayed in this figure.

Similarly, the use of any of these concepts indicates that this idea is active, some words more than others. For example, the word job is caused most by this concept. We examine this by looking at a different output, this one available for all terminals, for the word "jobs". FIG. 18 shows this output. Starting from the line "TERMINAL: jobs". The next line is "Firing: 3049398.000000" which means the sum of probabilities of occurrence of this word over the previous iteration is 3049398 (note that because of compounding, a terminal can have a probability of occurrence in a session different than 1.0). The next few lines detail the clusters that cause this terminal most strongly, the first being the [jobs job employment in job-search careers] cluster! Note that many more clusters link to this terminal, and only the most significant ones are displayed in this figure.

Now, the terminal "in" is in the [jobs job employment in job-search careers] cluster, but, selecting the page for the terminal in (shown in FIG. 19), we see that CANADA is the cluster that causes "in" the most. The interpretation of this is as follows: "in" is used when people are talking about jobs, but "in" is also caused by other things more often, so it is not as strong an indicator as the word "jobs" in what people are searching for. Note here as well that many more clusters link to this terminal, and only the most significant ones are displayed in this figure.

Now, we're ready to look at the search box on the top of the page. We enter the query "palo alto restaurants" into the box and click Search. FIG. 20 shows the results of this search. Let's begin with the line "QUERY: palo alto restaurants". This is simply what was typed into the box. The next two lines are the compound "palo alto" and the word "restaurants". They represent the current compounding (sometimes called segmentation) of the query.

Now, let's examine the numbers next to the word palo-alto. The last number, 9.9789, is the number of bits it takes to represent the word. There is a duality between bit representation cost and probability, where bit cost is the negative of the log base 2 of the probability. This means that the word palo-alto occurs roughly one in $2^{9.9789}$ (around 1000) times a word occurs. The number in the middle is an APPROXIMATION to how many bits the word requires given that the other words have been seen. The word palo-alto does not get better (more likely) but the word restaurants does! This is because people searching for palo alto with a very high frequency (around 1 in $2^{3.7}$ or 1 in 10) want restaurants in palo alto. The same might apply in a document for people writing about palo alto.

One use of this information is in determining which words in a literal search can be dropped because they are less specifying than the others. For example, if a search for "palo alto" restaurants does not return enough results from a corpus of documents, perhaps you can look for pages that just mention palo alto and see if they are about restaurants but use a different word (like one of the words in the [restaurants in resturants restuarants dining best] cluster for example). The first number for palo-alto 15.2624 is also a bit cost, but assuming that the highly probable (>0.95) clusters in a document are on, which none are for this session. This number is also an approximation.

The line beginning with "session graph 8 nodes 16 edges" talks about the local network introduced to solve for the evidence of having seen the terminals. Note that our model has MANY more than 8 clusters, however, the terminal and cluster sparseness techniques means that we only have to look at 8 nodes total! Here a node can be either a cluster or a terminal. The rest of that line deals with timing information. The next few lines display information about all the clusters found in the query. The first is a restaurant cluster named [restaurants in resturants restuarants dining best]. There are three columns of numbers on the left. The first is the probability of the cluster. The second is its probability times its activation. The third is its probability times an adjusted activation. Recall that the activation inside a local network is just set arbitrarily at the number of possible words that it could trigger that are true. Once we have solved the network, we can make another more educated guess at where the terminals originate from. We do this by computing the probabilities of the trigger nodes between each cluster and each terminal. The cluster then gets credit for the probability of each terminal it launches as "adjusted activation".

The second cluster to be found is the [san-jose ca sunnyvale santa-clara bay-area mountain-view] cluster, with a probability of existence of 0.682912. The third is a cluster of [palo-alto menlo-park restaurant evvia palo straits-cafe] with probability of 0.37. An interesting thing to note here is that both "Evvia" and "Straits Cafe" are actually restaurants in Palo Alto. This cluster has specialized to be the concept of restaurants around Palo Alto!

In this way, our model can be used to estimate the probabilities that various concepts are present in any piece of text. The same can be done for web pages as well, and by looking at the joint concepts present in a web page and a query, one of the uses of our model is for a search over web pages. The next section talks about some of the uses of our model.

Uses of the Model

This section details some of the possible uses of our model.
(1) Guessing at the concepts behind a piece of text. The concepts can then be displayed to a user allowing the user to better understand the meaning behind the text.
(2) Comparing the words and concepts between a document and a query. This can be the information retrieval scoring function that is required in any document search engine, including the special case where the documents are web pages.
(3) A different way of using our model for web search is to assume that the distribution of clusters extends the query. For example, a query for the word "jaguar" is ambiguous. It could mean either the animal or the car. Our model will identify clusters that relate to both meanings in response to this search. In this case, we can consider that the user typed in one of either two queries, the jaguar (CAR) query or the jaguar (ANIMAL) query. We can then retrieve documents for both of these queries taking into account the ratio of their respective clusters' probabilities. By carefully balancing how many results we return for each meaning, we assure a certain diversity of results for a search.
(4) Comparing the words and concepts between a document and an advertisement. This can be used as a proxy for how well an advertisement will perform if attached to a certain piece of content. A specialization of this is attaching advertisements to web pages.
(5) Comparing the words and concepts between a query and an advertisement (or targeting criteria for an advertisement). In search engines, advertisers often select a set of "targeting criteria", which when they show up in user queries, and ad is served. These text of these criteria (and the ad copy itself) can be compared to a query via the use of clusters in our model. This comparison can be a proxy for how well the ad will perform if served on a search page resulting from the query.
(6) Comparing the words and concepts between two documents. This can be used as a distance metric for conceptual clustering of documents, where similar documents are grouped together.
(7) Projecting text into the space of clusters. The probabilities of clusters in the text can be used as features for an arbitrary classification task. For example, a pornography filter can be produced by projecting the text of a page onto clusters, and then building a classifier that uses the clusters and the words as its input.
(8) Generalizing a web query to retrieve more results, using the bit cost or probability of a set of words or terminals given their parent clusters.
(9) Guessing at whether a particular word is a misspelling of another word by looking at the concepts induced by the two words.

Local Inference Mechanisms

It is possible to solve local networks with approaches other than loopy despite using loopy on the global nodes. An advantage with such approaches is that they may converge faster or more correctly than loopy. The following two sections detail alternate inference mechanisms that can be used on the local networks.

Another Local Inference Mechanism

Another way to do inference in the local networks is to look for a few good solutions to the problem instead of running loopy. We search around the space of complete instantiations of the network to find a set of good solutions to our network. We treat these as if they were a complete enumeration of the solutions to the network. We can send up link messages similar to the ones loopy sends, but more accurate, if we consider a good enough set of solutions. The remainder of our system remains largely the same.

Note that each time a cluster is flipped, we can quickly update the probability of the entire network, and all of these probabilities are stored (this is because the probability of an instantiation is the product of a number of local conditional probability tables). During the search, a history is stored for each cluster in the network. This helps us compute the link messages faster at the end.

Usually, our search over complete instantiations proceeds like this: We start with all clusters off, except for CANADA. We then hill-climb to a local optimum by flipping individual clusters on or off. Then, for each cluster node other than CANADA, we start at the global optimum so far, we flip the value of that node, and, keeping the value of that node fixed, we hill-climb on the rest of the nodes until a local optimum is reached. If in the process, we find a new global optimum, we start over with that global optimum. In this way, we are guaranteed of considering pretty good solutions with each value of each of the non-CANADA cluster nodes.

One advantage of this method is that the search can be limited arbitrarily in order to trade off speed of execution versus accuracy. In the analysis of larger pieces of text, in order to have our model return in an adequate amount of time, the tradeoff is often made in favor of speed of execution.

Yet Another Local Inference Mechanism

One more way to do inference in the local networks is to run loopy for a while and see if it converges quickly or not. There are theoretical results that indicate that if loopy converges quickly, it converges more correctly. In this case, if loopy does not converge quickly, one or more nodes can be "conditioned" i.e. loopy is run for both true and false values of these variables. If the network is conditioned enough, loopy becomes more stable, this is because conditioning on the top or side of loops breaks the cycle of message looping in loopy (for various theoretical reasons). This conditioning is applied recursively until loopy converges quickly. After running conditioned loopy, the result is various conditions under which all the link messages are known.

All that remains is to be able to combine the conditions together in their relative probabilities (since the conditions are usually distinct). One technique we have devised is to estimate the combination probabilities after loopy has settled on a network using a measure of the entropy of the network (roughly the number of remaining free bits at network convergence) and the energy of the network (roughly the amount that the network solution violates previous constraints). This approximation allows us to combine the various link messages in the correct order, and the remainder of our model remains largely the same.

Process of Characterizing a Document

Figure 21:
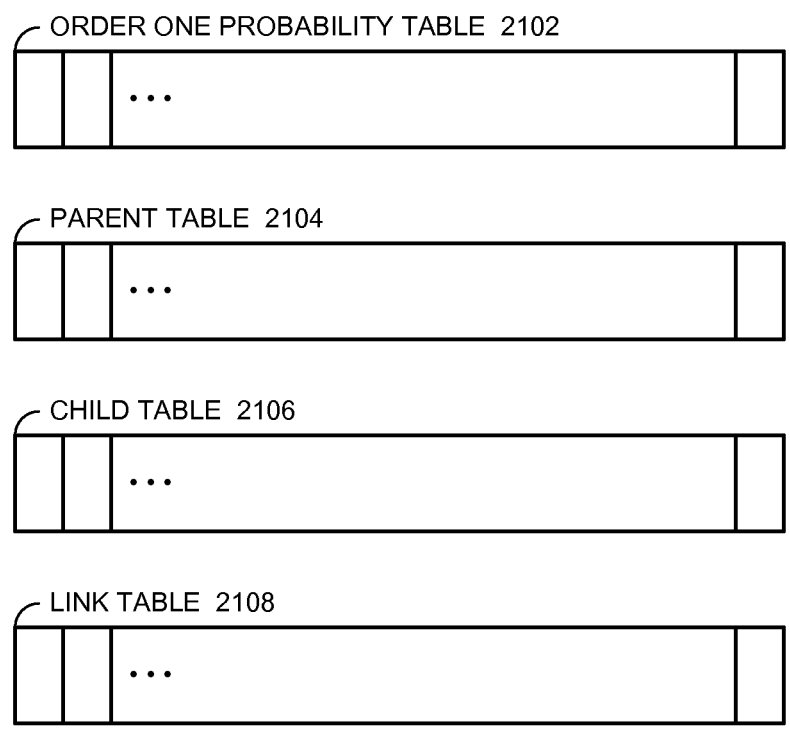
FIG. 21 illustrates data structures involved in characterizing a document in accordance with an embodiment of the present invention.

FIG. 21 illustrates data structures involved in characterizing a document in accordance with an embodiment of the present invention. These data structures include, order one probability table 2102, parent table 2104, child table 2106 and link table 2108.

Order one probability table 2102 includes entries for each node in the probabilistic model that approximate the order one (unconditional) probability that the node is active in generating a given set of words. Hence, an entry in order one probability table 2102 indicates how common an associated word or cluster is in sets of words that are generated by the probabilistic model. In one embodiment of the present invention, order one priority table 2102 also includes an "activation" for each cluster node indicating how many how many links from the candidate cluster to other nodes are likely to fire.

Parent table 2104 includes entries that identify parents of associated nodes in the probabilistic model, as well as the link weights from the identified parents.

Similarly, child table 2106 includes entries that identify children of associated nodes in the probabilistic model, as well as the link weights to the identified children.

Note that order one probability table 2102, parent table 2104 and child table 2106 are pre-computed for the probabilistic model, prior to characterizing the document. On the other hand, link table 2108 is populated during the process of characterizing a document.

Link table 2108 includes entries for links to consider as evidence while constructing an evidence tree as is discussed below with reference to FIGS. 22-25. Each entry in link table 2108 contains the weight for an associated link as well as the identifier for the associated parent node. Moreover, link table 2108 can be sorted by parent identifier as is discussed below.

Figures 22, 23:
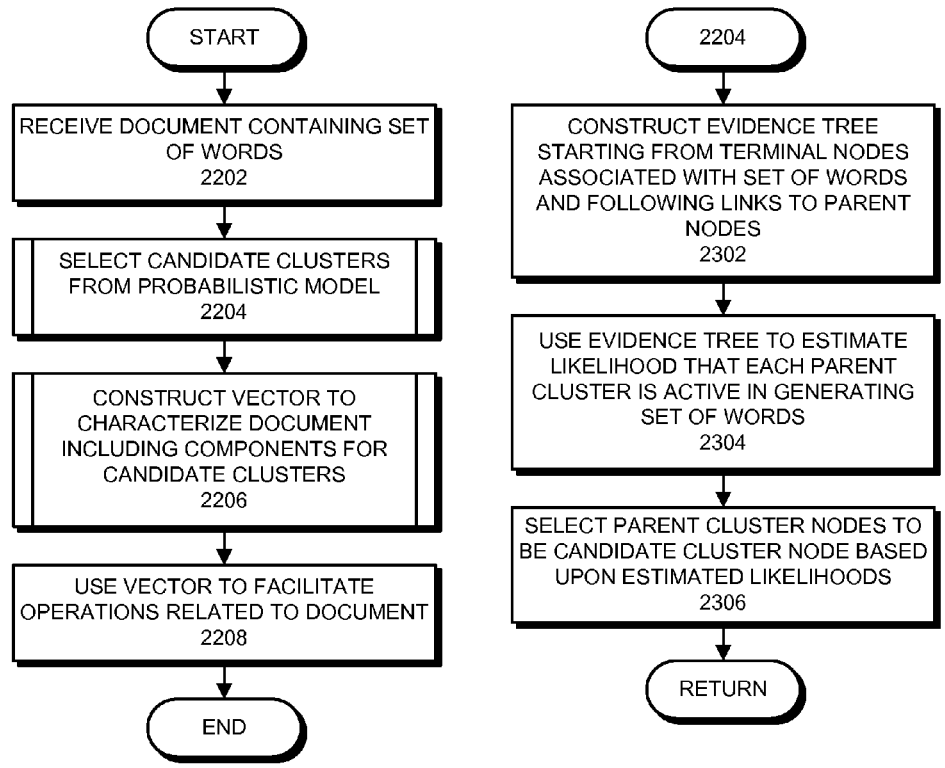
FIG. 22 presents a flow chart of the characterization process in accordance with an embodiment of the present invention.
FIG. 23 presents of a flow chart of the process for selecting candidate clusters in accordance with an embodiment of the present invention.

FIG. 22 presents a flow chart of the characterization process in accordance with an embodiment of the present invention. The system starts by receiving a document containing a set of words (step 2202). Note that this document can include a web page or a set of terms (words) from a query.

Next, the system selects a set of "candidate clusters" from the probabilistic model that are likely to be active in generating the set of words (step 2204). This process is described in more detail below with reference to FIG. 23. Note that by selecting a set of candidate clusters, the system limits the number of clusters that are considered in subsequent computational operations, thereby reducing the amount of computation involved in characterizing the document.

The system then constructs a vector (set of components) to characterize the document (step 2206). This vector includes components for candidate clusters, wherein each component of the vector indicates a degree to which the corresponding candidate cluster was active in generating the set of words in the document. This process is described in more detail below with reference to FIGS. 24-25.

Finally, the system can use this vector to facilitate a number of different operations related to the document (step 2208). Some of these uses are listed above in a preceding section of this specification entitled "Uses of the Model".

FIG. 23 presents of a flow chart of the process for selecting candidate clusters in accordance with an embodiment of the present invention. This flow chart describes in more detail the operations involved in performing step 2204 in FIG. 22. The system starts by constructing an "evidence tree" starting from terminal nodes associated with the set of words in the document and following links to parent nodes (step 2302). As a node is selected to be part of the evidence tree, links to the node from parent nodes are inserted into link table 2108.

During the process of constructing the evidence tree, the system uses the evidence tree to estimate the likelihood that each parent cluster is active in generating the set of words (step 2304). More specifically, in one embodiment of the present invention, for a cluster node $C_i$ that only points to terminal nodes, the system estimates the likelihood that $C_i$ was involved in generating the set of words (we refer to this estimated likelihood as the "Guess of $C_i$") using the following formula, $$\text{Guess}(C_i) = O1(C_i) \prod_j \frac{\tilde{P}(C_i \to w_j)}{\tilde{P}(w_j)}$$

wherein $$\tilde{P}(C_i \to w_j) = (\text{weight}_{C_i \to w_j})(\text{activation}_{C_i}),$$

and wherein $$\tilde{P}(w_j) = O1(w_j) \times (\#\text{words}).$$

This formula indicates that the guess of $C_i$ is the order one probability of $C_i$ multiplied by a product of conditional probability contributions from active child nodes $w_j$ of $C_i$. The numerator of this contribution, $\tilde{P}(C_i \to w_j)$, is the weight of the link from $C_i$ to $w_j$ multiplied by a guess at the activation of $C_i$. Recall that the activation of $C_i$ is an indicator of the number of active links out of node $C_i$. The denominator of this contribution, $\tilde{P}(w_j)$, is the order one probability of $w_j$ multiplied by the number of words in the set of words.

For a cluster node, $C_i$, that points to other cluster nodes, the formula is slightly different, $$\text{Guess}(C_i) = O1(C_i) \cdot \text{Score}(C_i),$$

wherein $$\text{Score}(C_i) = \prod_k \text{Contribution}(C_k, C_i) \prod_j \text{Contribution}(w_j, C_i).$$

As in the case of a cluster node that only points to terminals, the guess of $C_i$ is the order one probability of $C_i$ multiplied by a product of conditional probability contributions. However, these conditional probability contributions come from other cluster nodes $C_k$ as well as from child nodes $w_j$.

The contribution from child nodes is the same as in the case where the cluster node that only points to terminals, $$\text{Contribution}(w_j, C_i) = \frac{\tilde{P}(C_i \to w_j)}{\tilde{P}(w_j)}.$$

The contribution from other cluster nodes is more complicated, $$\text{Contribution}(C_k, C_i) = \frac{P(C_k | C_i) \cdot \text{Score}(C_k) + 1 - P(C_k | C_i)}{P(C_k) \cdot \text{Score}(C_k) + 1 - P(C_k)},$$

wherein $P(C_k|C_i)$ is the conditional probability of $C_k$ given $C_i$, $P(C_k)$ is the order one probability of $C_k$, and $\text{Score}(C_k)$ is the previously calculated score of $C_k$. Note that since the evidence tree is constructed from terminals up, the score of the child node $C^k$ will have been computed before the score of the parent node $C_i$ is computed.

In one embodiment of the present invention, the system marks terminal nodes during the estimation process for a given cluster node to ensure that terminal nodes are not factored into the estimation more than once.

Finally, the system selects parent nodes to be candidate cluster nodes based on these estimated likelihoods (step 2306). At the end of this "parent picking" process, the system has a set of candidate clusters to consider along with their activations.

FIG. 24 presents a flow chart of the process of approximating probabilities for candidate clusters in accordance with an embodiment of the present invention. The system first selects states for the probabilistic model that are likely to have generated the set of words (step 2402).

Next, the system constructs the vector, wherein the vector includes components for candidate clusters. Each of these components indicates a likelihood that a corresponding candidate cluster is active in generating the set of words. In order to estimate a component, the system considers only selected states in approximating the probability that an associated candidate cluster is active in generating the set of words (step 2404).

More specifically, in one embodiment of the present invention, the system calculates a given component $V_i$ of the vector associated with a cluster node $C_i$ to be, $$V_i = \text{Activation}(C_i) \times P(C_i),$$

wherein the Activation($C_i$) is an indicator of the number of links that will fire if node $C_i$ fires, and wherein $P(C_i)$ is the probability that $C_i$ is active in generating the set of words in the document.

$P(C_i)$ can be calculated as, $$P(C_i) = \frac{\sum P_{network}(C_i \text{ is on})}{\sum P_{network}(\text{explored})}.$$

This formula indicates that $P(C_i)$ is the sum of the network probabilities for networks in which $C_i$ is discovered to be active divided by the sum of all network probabilities for networks that have been explored.

The probability of a given network state occurring can be calculated as, $$P_{network} = \prod_{\substack{\text{nodes } j \\ \text{that are on}}} \left(1 - \prod_{\substack{\text{nodes } i \text{ that are} \\ \text{on and point to } j}} (1 - w_{i \to j})\right) \prod_{\substack{\text{nodes } k \\ \text{that are off}}} \left(\prod_{\substack{\text{nodes } i \text{ that are} \\ \text{on and point to } k}} (1 - w_{i \to k})\right)$$

This probability includes contributions from nodes that are "on". More specifically, for each node j that is on in a given network, the system computes the probability that at least one link into j (from an active parent node i) fires. This is one minus the probability that no link into j from an active parent node i fires, wherein the probability that a link from an active node does not fire is one minus the link weight.

The probability also includes contributions from nodes k that are "off". For a given node k that is off, the contribution is the probability that no link points to k from active node i, which is simply the product of one minus the link weights.

FIG. 25 illustrates how states for the probabilistic model are selected in accordance with an embodiment of the present invention. This flow chart describes in more detail the operations involved in performing step 2402 in FIG. 25. In order to limit the amount of computational work involved in selecting states, one embodiment of the present invention considers only candidate cluster nodes and terminal nodes associated with the set of words in the document. All other nodes are ignored.

The system starts by randomly selecting a starting state for the probabilistic model (step 2502). Each starting state indicates which nodes in the probabilistic model are active and which ones are not. Note that any starting state is possible because the universal node can trigger any subset of the candidate nodes to fire.

Also note that link weights in the probabilistic model tend to make some states more likely than others in generating the set of words in the document. Hence, it is unlikely that a random starting state would have generated the set of words in the document. In order to find a more likely state, the system performs "hill-climbing" operations to reach a state that is likely to have generated the set of words in the document (step 2504). Note that a large number of well-known hill climbing techniques can be used for this purpose. A hill-climbing operation, typically changes the state of the system in a manner that increases the value of a specific objective function. In this case, the objective function is the probability of a given network state occurring, $P_{network}$, which is described above.

In one embodiment of the present invention, the system periodically changes the state of an individual candidate cluster between hill-climbing operations without regards to the objective function. In doing so, the system fixes the changed state so it does not change during subsequent hill-climbing operations. This produces a local optimum for the objective function, which includes the changed state, which enables to system to explore states of the probabilistic model that are otherwise unreachable through only hill-climbing operations.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method comprising:
    receiving resource that includes a set of words;
    identifying a set of candidate clusters from a probabilistic model that are classified as likely to be active in generating the set of words;
    generating a vector that characterizes the resource, wherein, for each cluster of the set of candidate clusters, a component of the vector indicates a degree to which the cluster was active in generating the set of words; and
    using the vector in performing an operation related to the resource.

2. The method of claim 1, wherein identifying a set of candidate clusters from a probabilistic model that are classified as likely to be active in generating the set of words comprises:
    generating an evidence tree for the set of words, wherein the evidence tree identifies one or more clusters that each link to terminal nodes associated with the set of words;
    determining, using the evidence tree and for each cluster, a respective likelihood that the cluster is active in generating the set of words; and selecting one or more of the clusters as candidate clusters based on their respective likelihoods.

3. The method of claim 1, wherein generating a vector that characterizes the resource, wherein, for each cluster of the set of candidate clusters, a component of the vector indicates a degree to which the cluster was active in generating the set of words comprises:
selecting, for the probabilistic model, one or more states that are likely to generate the set of words;
generating, using the one or more selected states and for each cluster in the set of candidate clusters, a respective likelihood that the cluster is active in generating the set of words; and
generating, based on the respective likelihoods, a vector that characterizes the resource, wherein the vector includes a respective component for each cluster of the set of candidate clusters, and wherein each component indicates a respective likelihood that the cluster is active in generating the set of words.

4. The method of claim 3, wherein the respective likelihood that the cluster is active in generating the set of words is based on a ratio of a numerator and a denominator, wherein the numerator is a sum of probabilities for states, in the one or more states, in which the cluster is determined to be active, and wherein the denominator is a sum of probabilities for all states in the one or more states in which the cluster is determined to be active or inactive.

5. The method of claim 3, wherein selecting, using the probabilistic model, one or more states that are likely to generate the set of words comprises:
selecting, for the probabilistic model, a starting state, wherein the starting state identifies nodes in the probabilistic model as being active or inactive; and
determining, using the starting state, one or more states that are likely to generate the set of words, the one or more states having been determined based on a hill climbing operation.

6. The method of claim 5, wherein the nodes in the probabilistic model comprise one or more clusters that correspond to the set of words and one or more terminal nodes that correspond to the set of words.

7. The method of claim 1, wherein using the vector in performing an operation related to the resource comprises identifying, based on the vector, one or more concepts related to the resource, the concepts providing a meaning of the resource.

8. A system comprising:
a non-transitory computer readable medium having instructions stored thereon; and
data processing apparatus programmed to execute the instructions to perform operations comprising:
receiving resource that includes a set of words;
identifying a set of candidate clusters from a probabilistic model that are classified as likely to be active in generating the set of words;
generating a vector that characterizes the resource, wherein, for each cluster of the set of candidate clusters, a component of the vector indicates a degree to which the cluster was active in generating the set of words; and
using the vector in performing an operation related to the resource.

9. The system of claim 8, wherein identifying a set of candidate clusters from a probabilistic model that are classified as likely to be active in generating the set of words comprises:
generating an evidence tree for the set of words, wherein the evidence tree identifies one or more clusters that each link to terminal nodes associated with the set of words;
determining, using the evidence tree and for each cluster, a respective likelihood that the cluster is active in generating the set of words; and
selecting one or more of the clusters as candidate clusters based on their respective likelihoods.

10. The system of claim 8, wherein generating a vector that characterizes the resource, wherein, for each cluster of the set of candidate clusters, a component of the vector indicates a degree to which the cluster was active in generating the set of words comprises:
selecting, for the probabilistic model, one or more states that are likely to generate the set of words;
generating, using the one or more selected states and for each cluster in the set of candidate clusters, a respective likelihood that the cluster is active in generating the set of words; and
generating, based on the respective likelihoods, a vector that characterizes the resource, wherein the vector includes a respective component for each cluster of the set of candidate clusters, and wherein each component indicates a respective likelihood that the cluster is active in generating the set of words.

11. The system of claim 10, wherein the respective likelihood that the cluster is active in generating the set of words is based on a ratio of a numerator and a denominator, wherein the numerator is a sum of probabilities for states, in the one or more states, in which the cluster is determined to be active, and wherein the denominator is a sum of probabilities for all states in the one or more states in which the cluster is determined to be active or inactive.

12. The system of claim 10, wherein selecting, using the probabilistic model, one or more states that are likely to generate the set of words comprises:
selecting, for the probabilistic model, a starting state, wherein the starting state identifies nodes in the probabilistic model as being active or inactive; and
determining, using the starting state, one or more states that are likely to generate the set of words, the one or more states having been determined based on a hill climbing operation.

13. The system of claim 12, wherein the nodes in the probabilistic model comprise one or more clusters that correspond to the set of words and one or more terminal nodes that correspond to the set of words.

14. The system of claim 8, wherein using the vector in performing an operation related to the resource comprises identifying, based on the vector, one or more concepts related to the resource, the concepts providing a meaning of the resource.

15. A non-transitory computer-readable medium having instructions stored thereon that, when executed by a processor, cause the processor to perform operations comprising:
receiving resource that includes a set of words;
identifying a set of candidate clusters from a probabilistic model that are classified as likely to be active in generating the set of words;
generating a vector that characterizes the resource, wherein, for each cluster of the set of candidate clusters, a component of the vector indicates a degree to which the cluster was active in generating the set of words; and
using the vector in performing an operation related to the resource.

16. The medium of claim 15, wherein identifying a set of candidate clusters from a probabilistic model that are classified as likely to be active in generating the set of words comprises:
   generating an evidence tree for the set of words, wherein the evidence tree identifies one or more clusters that each link to terminal nodes associated with the set of words;
   determining, using the evidence tree and for each cluster, a respective likelihood that the cluster is active in generating the set of words; and
   selecting one or more of the clusters as candidate clusters based on their respective likelihoods.

17. The medium of claim 15, wherein generating a vector that characterizes the resource, wherein, for each cluster of the set of candidate clusters, a component of the vector indicates a degree to which the cluster was active in generating the set of words comprises:
   selecting, for the probabilistic model, one or more states that are likely to generate the set of words;
   generating, using the one or more selected states and for each cluster in the set of candidate clusters, a respective likelihood that the cluster is active in generating the set of words; and
   generating, based on the respective likelihoods, a vector that characterizes the resource, wherein the vector includes a respective component for each cluster of the set of candidate clusters, and wherein each component indicates a respective likelihood that the cluster is active in generating the set of words.

18. The medium of claim 17, wherein the respective likelihood that the cluster is active in generating the set of words is based on a ratio of a numerator and a denominator, wherein the numerator is a sum of probabilities for states, in the one or more states, in which the cluster is determined to be active, and wherein the denominator is a sum of probabilities for all states in the one or more states in which the cluster is determined to be active or inactive.

19. The medium of claim 17, wherein selecting, using the probabilistic model, one or more states that are likely to generate the set of words comprises:
   selecting, for the probabilistic model, a starting state, wherein the starting state identifies nodes in the probabilistic model as being active or inactive; and
   determining, using the starting state, one or more states that are likely to generate the set of words, the one or more states having been determined based on a hill climbing operation.

20. The medium of claim 19, wherein the nodes in the probabilistic model comprise one or more clusters that correspond to the set of words and one or more terminal nodes that correspond to the set of words.

21. The medium of claim 15, wherein using the vector in performing an operation related to the resource comprises identifying, based on the vector, one or more concepts related to the resource, the concepts providing a meaning of the resource.

* * * * *

UNITED STATES PATENT AND TRADEMARK OFFICE
CERTIFICATE OF CORRECTION

PATENT NO. : 8,688,720 B1
APPLICATION NO. : 12/131637
DATED : April 1, 2014
INVENTOR(S) : Harik et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 729 days.

Signed and Sealed this
Eleventh Day of August, 2015

Michelle K. Lee
*Director of the United States Patent and Trademark Office*